(12) United States Patent
Sato

(10) Patent No.: US 8,564,232 B2
(45) Date of Patent: Oct. 22, 2013

(54) MOTOR DRIVE CONTROL DEVICE

(75) Inventor: Toshiaki Sato, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 550 days.

(21) Appl. No.: 12/812,764

(22) PCT Filed: Jan. 20, 2009

(86) PCT No.: PCT/JP2009/050705
§ 371 (c)(1),
(2), (4) Date: Jul. 14, 2010

(87) PCT Pub. No.: WO2009/093551
PCT Pub. Date: Jul. 30, 2009

(65) Prior Publication Data
US 2011/0043146 A1    Feb. 24, 2011

(30) Foreign Application Priority Data

Jan. 21, 2008  (JP) .................................. 2008-010517
Jan. 8, 2009   (JP) .................................. 2009-002889

(51) Int. Cl.
H02P 6/00   (2006.01)
H02P 6/20   (2006.01)

(52) U.S. Cl.
USPC ............. 318/400.21; 318/400.04; 318/400.11

(58) Field of Classification Search
USPC .................. 318/700, 400.01, 400.04, 400.11, 318/400.16, 400.21, 400.32, 400.34, 318/400.38, 400.41
See application file for complete search history.

(56) References Cited

U.S. PATENT DOCUMENTS

| 6,911,795 B2 * | 6/2005 | Matsuoka et al. ............ 318/437 |
| 6,918,688 B2 * | 7/2005 | Ishida ........................... 362/467 |
| 7,187,153 B2 * | 3/2007 | Imagawa et al. .............. 318/638 |
| 2003/0102861 A1 | 6/2003 | Kushihara |

FOREIGN PATENT DOCUMENTS

| JP | 08-331886 A1 | 12/1996 |
| JP | 2000-184774 A | 6/2000 |
| JP | 2001-112282 A | 4/2001 |
| JP | 2003-164187 A | 6/2003 |
| JP | 2004-201377 A | 7/2004 |
| JP | 2005-304133 A | 10/2005 |
| JP | 2005-312216 A | 11/2005 |
| JP | 2007-151266 A | 6/2007 |

OTHER PUBLICATIONS

International Preliminary Report of corresponding PCT Application No. PCT/JP2009/050705.

* cited by examiner

*Primary Examiner* — Bentsu Ro
(74) *Attorney, Agent, or Firm* — Global IP Counselors

(57) ABSTRACT

A motor drive control device is configured to control driving of a brushless DC motor including a stator having drive coils, a rotor having plural magnetic poles, and plural position detecting units that output position detection signals representing position of the rotor with respect to the stator. The motor drive control device includes a drive voltage generating unit configured to generate and output drive voltages to the motor to drive the motor. An abnormality detecting unit can be used to detect abnormality of the position detection signals. When abnormality of at least one of the position detection signals has been detected by the abnormality detecting unit, the motor drive control device can drive the motor based on at least one of the remaining position detection signals excluding the position detection signal that has been detected as abnormal.

19 Claims, 10 Drawing Sheets

SIGNAL DECISION TABLE 1

| POSITION DETECTION SIGNAL | | | U-PHASE | | V-PHASE | | W-PHASE | |
|---|---|---|---|---|---|---|---|---|
| Hu | Hv | Hw | Gu | Gx | Gv | Gy | Gw | Gz |
| 0 | 1 | 0 | ON | OFF | OFF | ON | OFF | OFF |
| 0 | 1 | 1 | ON | OFF | OFF | OFF | OFF | ON |
| 0 | 0 | 1 | OFF | OFF | ON | OFF | OFF | ON |
| 1 | 0 | 1 | OFF | ON | ON | OFF | OFF | OFF |
| 1 | 0 | 0 | OFF | ON | OFF | OFF | ON | OFF |
| 1 | 1 | 0 | OFF | OFF | OFF | ON | ON | OFF |

FIG. 3

SIGNAL DECISION TABLE 2

| POSITION DETECTION SIGNAL | | | POSITION-AT-TIME-OF-ABNORMALITY ESTIMATION SIGNAL Hw2' | U-PHASE | | V-PHASE | | W-PHASE | |
|---|---|---|---|---|---|---|---|---|---|
| Hu | Hv | | | Gu | Gx | Gv | Gy | Gw | Gz |
| 0 | 0 | 1 | 0 | ON | OFF | OFF | ON | OFF | OFF |
| 0 | 0 | 1 | 1 | ON | OFF | OFF | OFF | OFF | ON |
| 0 | 1 | 0 | 1 | OFF | OFF | ON | OFF | OFF | ON |
| 1 | 1 | 0 | 1 | OFF | ON | ON | OFF | OFF | OFF |
| 1 | 1 | 0 | 0 | OFF | ON | OFF | OFF | ON | OFF |
| 1 | 0 | 1 | 0 | OFF | OFF | OFF | ON | ON | OFF |

FIG. 4

MOTOR DRIVE CONTROL DEVICE

CROSS-REFERENCE TO RELATED APPLICATIONS

This U.S. National stage application claims priority under 35 U.S.C. §119(a) to Japanese Patent Application Nos. 2008-010517, filed in Japan on Jan. 21, 2008, and 2009-002889, filed in Japan on Jan. 8, 2009, the entire contents of which are hereby incorporated herein by reference.

TECHNICAL FIELD

The present invention relates to a motor drive control device and particularly to a motor drive control device that controls the driving of a brushless DC motor on the basis of signals of position detecting units that detect the position of a rotor.

BACKGROUND ART

In recent years, in air conditioning apparatus equipped with devices such as compressor and fan, a 3-phase brushless DC motor, for example, has been used as the power source of these devices.

Generally, a 3-phase brushless DC motor has a rotor (hereinafter called a rotor), which comprises a permanent magnet having plural magnetic poles, and a stator (hereinafter called a stator), which has 3-phase drive coils. Drive voltages corresponding to the position of the rotor with respect to the stator are applied to the drive coils of this brushless DC motor by a motor drive control device for driving and controlling this motor. Thus, currents corresponding to the drive voltages flow in the drive coils, a magnetic field is generated, and the rotor rotates.

Here, among methods of detecting the position of the rotor with respect to the stator, a method using three rotor position detection sensors placed so as to correspond to each of the 3-phase drive coils is often used. These rotor position detection sensors are for detecting the relative position of the rotor with respect to the stator on the basis of the magnetic field that has arisen because of the permanent magnet of the rotor, and specific examples thereof include Hall elements and Hall ICs. However, when trouble such as a fault arises in these position detection sensors, the position detection sensor in which the trouble has arisen becomes unable to normally detect the position of the rotor. In this case, the motor drive control device ends up applying to the motor drive voltages where, for example, the half cycle of one cycle has a normal waveform but the remaining half cycle has a waveform that is out of phase. When this happens, there is the fear that the currents energizing the motor will increase, that motor noise and vibration will increase, and that the rotation of the motor will become unstable.

Thus, for example, as described in patent document 1 (JP-A No. 8-331886) and patent document 2 (JP-A No. 2000-184774), there are known motor drive control devices that detect whether or not trouble is arising in the position detection sensors. The motor drive control devices of patent document 1 and patent document 2 stop driving the motor when they have detected that there is trouble in the position detection sensors.

SUMMARY

Technical Problem

Incidentally, depending on the intended use of the motor and the like, sometimes it becomes necessary to continue to rotate the motor even when trouble has arisen in the position detection sensors. However, when the motor drive control devices of patent document 1 and patent document 2 are applied in such cases, the rotation of the motor ends up stopping when trouble has arisen in the position detection sensors, so it becomes difficult to continue to rotate the motor.

Thus, it is an object of the present invention to provide a motor drive control device which, in a brushless DC motor, can drive the motor to rotate even when trouble has arisen in a position detection sensor.

Solution to the Problem

A motor drive control device pertaining to a first aspect of the present invention is a motor drive control device that controls a driving of a brushless DC motor including a stator having drive coils, a rotor having plural magnetic poles, and plural position detecting units that output position detection signals representing the position of the rotor with respect to the stator, the motor drive control device comprising an abnormality detecting unit and a drive voltage generating unit. The abnormality detecting unit detects abnormality of each of the position detection signals. When abnormality of at least one of the position detection signals has been detected by the abnormality detecting unit, the drive voltage generating unit generates and outputs to the brushless DC motor drive voltages for driving the brushless DC motor on the basis of at least one of the remaining position detection signals excluding the position detection signal that has been detected as abnormal.

According to this motor drive control device, when, because trouble such as a fault has arisen in at least one of the position detecting units, there is abnormality in the position detection signal outputted from that position detecting units, the drive voltages generated on the basis of at least one of the remaining position detection signals that are not abnormal are outputted to the brushless DC motor. In this manner, the drive voltages are generated without the position detection signal that is abnormal being used, so the brushless DC motor can stably rotate without being affected by the position detection signal that is abnormal.

A motor drive control device pertaining to a second aspect of the present invention is the motor drive control device pertaining to the first aspect of the present invention, wherein the drive voltage generating unit estimates the position of the rotor using at least one of the remaining position detection signals excluding the position detection signal that has been detected as abnormal. Additionally, the drive voltage generating unit generates the drive voltages on the basis of the position of the rotor it has estimated.

According to this motor drive control device, the drive voltages are generated on the basis of the estimated position of the rotor instead of the drive voltages being generated using the position detection signal that is abnormal. Thus, the brushless DC motor can perform rotation more stably.

A motor drive control device pertaining to a third aspect of the present invention is the motor drive control device pertaining to the first aspect of the present invention, wherein the drive voltage generating unit selects and outputs to the brushless DC motor a pattern of the drive voltages that should be outputted to the brushless DC motor from among preset patterns of the drive voltages on the basis of at least one of the remaining position detection signals excluding the position detection signal that has been detected as abnormal.

Here, there will be taken as an example a case where the position detection signals are signals taking values of "1" or "0" and where one of the position detection signals is abnormal and is not to be used. According to this motor drive control device, when the values of the two position detection signals that are normal are both "1", "pattern 1" is selected as the pattern of the drive voltages. When the values of the two position detection signals that are normal are "0" and "1", "pattern 2" is selected as the pattern of the drive voltages. If all three of the position detection signals are normal, there are six patterns of the drive voltages, but if two of the position detection signals are normal as described above, there become four patterns of the drive voltages. For that reason, the energization widths of the drive voltages outputted to the brushless DC motor are not uniformly 120 degrees but become 60 degrees, 120 degrees and 180 degrees depending on the phases, and the values of the drive voltages also become different values depending on the phases, but when focused on per each phase, the drive voltages outputted to the brushless DC motor are positive and negative balanced, so stable operation of the brushless DC motor becomes possible.

A motor drive control device pertaining to a fourth aspect of the present invention is the motor drive control device pertaining to any of the first to third aspects of the present invention, further comprising a rotation speed detecting unit. The rotation speed detecting unit detects a rotation speed of the rotor using at least one of the remaining position detection signals excluding the position detection signal that has been detected as abnormal. Additionally, the drive voltage generating unit generates the drive voltages on the basis of the rotation speed of the rotor that has been detected by the rotation speed detecting unit.

According to this motor drive control device, the rotation speed is detected using the position detection signals that are not abnormal, and the drive voltages are generated on the basis of that rotation speed, so rotation speed control of the brushless DC motor becomes performed more appropriately.

A motor drive control device pertaining to a fifth aspect of the present invention is the motor drive control device pertaining to any of the first to fourth aspects of the present invention, wherein the position detecting units are one of Hall elements and Hall ICs.

Thus, the position of the rotor can be detected without having to use complicated circuits or operations, so costs can be reduced.

A motor drive control device pertaining to a sixth aspect of the present invention is the motor drive control device pertaining to any of the first to fifth aspects of the present invention, further comprising a phase difference detecting unit. The phase difference detecting unit detects phase differences between the remaining position detection signals excluding the position detection signal that has been detected as abnormal and induced voltages generated each of in the drive coils corresponding to the remaining position detection signals. Additionally, the drive voltage generating unit generates the drive voltages on the basis of the phase differences and polarities of the remaining position detection signals.

According to this motor drive control device, even when trouble arises in a position detecting unit whose specifications are unclear, for example, the brushless DC motor can rotate without being affected by the position detection signal that is abnormal.

A motor drive control device pertaining to a seventh aspect of the present invention is the motor drive control device pertaining to any of the first to fifth aspects of the present invention, further comprising a sensorless position estimating unit. The sensorless position estimating unit estimates the position of the rotor without using the position detection signals when all of the position detection signals have been detected as abnormal. Additionally, the drive voltage generating unit generates the drive voltages using the position of the rotor that has been estimated without using the position detection signals when the sensorless position estimating unit has estimated the position of the rotor.

According to this motor drive control device, even when trouble has arisen in all of the position detecting units, the brushless DC motor can continue rotation without being affected by the position detection signals outputted from the position detecting units in which the trouble is arising.

A motor drive control device pertaining to an eighth aspect of the present invention is the motor drive control device pertaining to any of the first to sixth aspects of the present invention, wherein the drive voltage generating unit decides an energization period of the drive voltages on the basis of a state of normality/abnormality of the position detection signals. Additionally, the drive voltage generating unit outputs the drive voltages during the energization period.

When at least one of the position detecting units is abnormal, sometimes the brushless DC motor after startup is affected by the position detection signal outputted from the position detecting units that is abnormal. When this happens, an increase in the currents energizing the brushless DC motor and also noise and vibration and the like end up arising. However, this motor drive control device outputs the drive voltages during the energization period it has decided on the basis of the state of normality/abnormality of the position detection signals and stops the output of the drive voltages, for example, outside the energization period. Thus, the brushless DC motor is not affected by the position detection signal that is abnormal after startup.

A motor drive control device pertaining to a ninth aspect of the present invention is the motor drive control device pertaining to the eighth aspect of the present invention, wherein the energization period is a period where the position detection signals are normal.

Thus, the drive voltages become outputted to the brushless DC motor in a period where the position detection signals are normal.

A motor drive control device pertaining to a tenth aspect of the present invention is the motor drive control device pertaining to any of the first to ninth aspects of the present invention, further comprising a position deciding unit. The position deciding unit decides a predetermined position of the rotor such that torque in a direction of forward rotation is generated at a time when the drive voltages have been applied at a time of startup of the brushless DC motor. Additionally, the drive voltage generating unit generates the drive voltages such that the rotor moves into the predetermined position and, after the rotor has moved into the predetermined position, generates the drive voltages for starting up the brushless DC motor.

When it is understood beforehand that the position detecting units are faulty before startup of the brushless DC motor, this motor drive control device moves the brushless DC motor into the predetermined position by direct-current excitation, for example, and thereafter starts up the brushless DC motor. Thus, immediately after startup of the brushless DC motor, torque in the direction of forward rotation is generated in the brushless DC motor, and thereafter the brushless DC motor starts up utilizing inertia, so the brushless DC motor can reliably start up.

A motor drive control device pertaining to an eleventh aspect of the present invention is the motor drive control device pertaining to any of the first to tenth aspects of the present invention, wherein the abnormality detecting unit performs abnormality detection of the position detection signals before startup of the brushless DC motor.

Thus, the brushless DC motor is not affected by the position detection signal that is abnormal from immediately after startup.

A motor drive control device pertaining to a twelfth aspect of the present invention is the motor drive control device pertaining to any of the first to eleventh aspects of the present invention, further comprising a display unit. The display unit can display that the abnormality detecting unit has detected abnormality of the position detection signals.

Thus, the user can know trouble is arising in the position detecting units.

A motor drive control device pertaining to a thirteenth aspect of the present invention is the motor drive control device pertaining to any of the first to twelfth aspects of the present invention, further comprising an instruction receiving unit. The instruction receiving unit can receive an instruction to execute the operation whereby the drive voltages are generated on the basis of at least one of the remaining position detection signals excluding the position detection signal that has been detected as abnormal.

According to this motor drive control device, the instruction receiving unit can receive, from the user via a remote controller, for example, an instruction to execute the operation whereby the drive voltages are generated. Additionally, when the motor drive control device has received this execution instruction, the motor drive control device can generate the drive voltages on the basis of at least one of the remaining position detection signals excluding the position detection signal that is abnormal. Consequently, the motor drive control device can drive the brushless DC motor by performing the operation of generating the drive voltages described above on the basis of the instruction from the user even when at least one of the position detection signals is abnormal.

A motor drive control device pertaining to a fourteenth aspect of the present invention is a motor drive control device that controls a driving of a brushless DC motor including a stator having drive coils, a rotor having plural magnetic poles, and plural position detecting units that output position detection signals representing the position of the rotor with respect to the stator, the motor drive control device comprising a position deciding unit, a fixed voltage generating unit and a drive voltage generating unit. The position deciding unit decides a predetermined position of the rotor such that torque in a direction of forward rotation is generated at a time of application of drive voltages for starting up the brushless DC motor when at least one of the position detecting units is abnormal. The fixed voltage generating unit generates and outputs to the brushless DC motor fixed voltages such that the rotor is fixed in the predetermined position. After the rotor has been fixed in the predetermined position, the drive voltage generating unit generates and outputs to the brushless DC motor the drive voltages.

When it is understood beforehand that the position detecting units are faulty before startup of the brushless DC motor, this motor drive control device moves the brushless DC motor into and fixes the brushless DC motor in the predetermined position by direct-current excitation, for example, and thereafter starts up the brushless DC motor. Thus, immediately after startup of the brushless DC motor, torque in the direction of forward rotation is generated in the brushless DC motor, and thereafter the brushless DC motor starts up utilizing inertia, so the brushless DC motor can reliably start up.

A motor drive control device pertaining to a fifteenth aspect of the present invention is the motor drive control device pertaining to the fourteenth aspect of the present invention, wherein the drive voltage generating unit decides an energization period of the drive voltages on the basis of a state of normality/abnormality of the position detection signals and outputs the drive voltages during the energization period.

When at least one of the position detecting units is abnormal, sometimes the brushless DC motor after startup is affected by the position detection signal outputted from the position detecting units that is abnormal. When this happens, an increase in the currents energizing the brushless DC motor and also noise and vibration and the like end up arising. However, this motor drive control device outputs the drive voltages during the energization period it has decided on the basis of the state of normality/abnormality of the position detection signals and stops the output of the drive voltages, for example, outside the energization period. Thus, the brushless DC motor is not affected by the position detection signal that is abnormal after startup.

A motor drive control device pertaining to a sixteenth aspect of the present invention is the motor drive control device pertaining to the fifteenth aspect of the present invention, wherein the energization period is a period where the position detection signals are normal.

Thus, the drive voltages become outputted to the brushless DC motor in a period where the position detection signals are normal.

A motor drive control device pertaining to a seventeenth aspect of the present invention is the motor drive control device pertaining to any of the fourteenth to sixteenth aspects of the present invention, further comprising an abnormality detecting unit. The abnormality detecting unit performs abnormality detection of the position detecting units before startup of the brushless DC motor.

Thus, the brushless DC motor can rotate without being affected by the position detection signal that is abnormal from immediately after startup.

A motor drive control device pertaining to an eighteenth aspect of the present invention is the motor drive control device pertaining to the seventeenth aspect of the present invention, further comprising a display unit. The display unit can display that the abnormality detecting unit has detected abnormality of the position detecting units.

Thus, the user can know trouble is arising in the position detecting units.

A motor drive control device pertaining to a nineteenth aspect of the present invention is the motor drive control device pertaining to any of the fourteenth to eighteenth aspects of the present invention, further comprising an instruction receiving unit. The instruction receiving unit can receive an instruction to execute the operation of deciding the predetermined position of the rotor by the position deciding unit, the operation of generating the fixed voltages by the fixed voltage generating unit, and the operation of generating the drive voltages by the drive voltage generating unit.

According to this motor drive control device, the instruction receiving unit can receive, from the user via a remote controller, for example, an instruction to execute the operation of deciding the predetermined position of the by the position deciding unit, the operation of generating the fixed voltages by the fixed voltage generating unit, and the operation of generating the drive voltages by the drive voltage generating unit. Additionally, when the motor drive control device has received this execution instruction, the motor drive control device first moves the brushless DC motor into and fixes the brushless DC motor in the predetermined position by direct-current excitation, for example, and thereafter starts up the brushless DC motor. Consequently, the motor drive control device can start up the brushless DC motor by performing the operation described above on the basis of the instruction from the user even when at least one of the position detecting units is abnormal.

A motor drive control device pertaining to a twentieth aspect of the present invention is a motor drive control device that controls a driving of a brushless DC motor including a stator having drive coils, a rotor having plural magnetic poles, and plural position detecting units that output position detection signals representing the position of the rotor with respect to the stator, the motor drive control device comprising a drive voltage generating unit and a sensorless position estimating unit. The drive voltage generating unit can generate and output to the brushless DC motor drive voltages for driving the brushless DC motor. The sensorless position estimating unit estimates the position of the rotor without using the position detection signals. Additionally, when all of the position detecting units are normal, the drive voltage generating unit generates the drive voltages on the basis of the position detection signals, and when at least one of the position detecting units is abnormal from before startup of the brushless DC motor, the drive voltage generating unit generates the drive voltages for starting up the brushless DC motor regardless of the position of the rotor and, after startup of the brushless DC motor, generates the drive voltages on the basis of the position of the rotor that has been estimated.

Thus, the brushless DC motor can start up without being affected by the position detecting units that is abnormal.

A motor drive control device pertaining to a twenty-first aspect of the present invention is the motor drive control device pertaining to the twentieth aspect of the present invention, further comprising a display unit. The display unit can display that the position detecting units are abnormal.

Thus, the user can know trouble is arising in the position detecting units.

A motor drive control device pertaining to a twenty-second aspect of the present invention is the motor drive control device pertaining to the twentieth or twenty-first aspect of the present invention, further comprising an instruction receiving unit. The instruction receiving unit can receive an instruction to execute the operations of the drive voltage generating unit. The instruction to execute the operations of the drive voltage generating unit is instructions such that, at the time of startup of the brushless DC motor, the drive voltages for starting up the brushless DC motor regardless of the position of the rotor are generated and such that, after startup of the brushless DC motor, the drive voltages are generated on the basis of the position of the rotor that has been estimated.

According to this motor drive control device, the instruction receiving unit can receive, from the user via a remote controller, for example, an instruction to execute, for example, the operation whereby the drive voltages are generated on the basis of the position of the rotor that has been estimated. Additionally, when the motor drive control device has received this execution instruction, the motor drive control device first generates the drive voltages for starting up the brushless DC motor regardless of the position of the rotor and next, after startup of the brushless DC motor, generates the drive voltages on the basis of the position of the rotor that has been estimated. Consequently, the motor drive control device can start up the brushless DC motor by performing the operation described above on the basis of the instruction from the user even when at least one of the position detecting units is abnormal.

Advantageous Effects of the Invention

According to the motor drive control device pertaining to the first aspect of the present invention, the drive voltages are generated without the position detection signal that is abnormal being used, so the brushless DC motor can stably rotate without being affected by the position detection signal that is abnormal.

According to the motor drive control device pertaining to the second aspect of the present invention, the drive voltages are generated on the basis of the estimated position of the rotor instead of the drive voltages being generated using the position detection signal that is abnormal, so the brushless DC motor can perform rotation more stably.

According to the motor drive control device pertaining to the third aspect of the present invention, the energization widths of the drive voltages outputted to the brushless DC motor are not uniformly 120 degrees but become 60 degrees, 120 degrees and 180 degrees depending on the phases, and the values of the drive voltages also become different values depending on the phases, but when focused on per each phase, the drive voltages outputted to the brushless DC motor are positive and negative balanced, so stable operation of the brushless DC motor becomes possible.

According to the motor drive control device pertaining to the fourth aspect of the present invention, the rotation speed is detected using the position detection signals that are not abnormal, and the drive voltages are generated on the basis of that rotation speed, so rotation speed control of the brushless DC motor becomes performed more appropriately.

According to the motor drive control device pertaining to the fifth aspect of the present invention, the position of the rotor can be detected without having to use complicated circuits or operations, so costs can be reduced.

According to the motor drive control device pertaining to the sixth aspect of the present invention, even when trouble arises in a position detecting unit whose specifications are unclear, for example, the brushless DC motor can rotate without being affected by the position detection signal that is abnormal.

According to the motor drive control device pertaining to the seventh aspect of the present invention, even when trouble has arisen in all of the position detecting units, the brushless DC motor can continue rotation without being affected by the position detection signals outputted from the position detecting units in which the trouble is arising.

According to the motor drive control device pertaining to the eighth aspect of the present invention, the brushless DC motor is not affected by the position detection signal that is abnormal after startup.

According to the motor drive control device pertaining to the ninth aspect of the present invention, the drive voltages become outputted to the brushless DC motor in a period where the position detection signals are normal.

According to the motor drive control device pertaining to the tenth aspect of the present invention, immediately after startup of the brushless DC motor, torque in the direction of forward rotation is generated in the brushless DC motor, and thereafter the brushless DC motor starts up utilizing inertia, so the brushless DC motor can reliably start up.

According to the motor drive control device pertaining to the eleventh aspect of the present invention, the brushless DC motor is not affected by the position detection signal that is abnormal from immediately after startup.

According to the motor drive control device pertaining to the twelfth aspect of the present invention, the user can know trouble is arising in the position detecting units.

According to the motor drive control device pertaining to the thirteenth aspect of the present invention, the motor drive control device can drive the brushless DC motor by performing the operation of generating the drive voltages described above on the basis of the instruction from the user even when at least one of the position detection signals is abnormal.

According to the motor drive control device pertaining to the fourteenth aspect of the present invention, immediately after startup of the brushless DC motor, torque in the direction of forward rotation is generated in the brushless DC motor, and thereafter the brushless DC motor starts up utilizing inertia, so the brushless DC motor can reliably start up.

According to the motor drive control device pertaining to the fifteenth aspect of the present invention, the brushless DC motor is not affected by the position detection signal that is abnormal after startup.

According to the motor drive control device pertaining to the sixteenth aspect of the present invention, the drive voltages become outputted to the brushless DC motor in a period where the position detection signals are normal.

According to the motor drive control device pertaining to the seventeenth aspect of the present invention, the brushless DC motor can rotate without being affected by the position detection signal that is abnormal from immediately after startup.

According to the motor drive control device pertaining to the eighteenth aspect of the present invention, the user can know trouble is arising in the position detecting units.

According to the motor drive control device pertaining to the nineteenth aspect of the present invention, the motor drive control device can start up the brushless DC motor by performing the operation described above on the basis of the instruction from the user even when at least one of the position detecting units is abnormal.

According to the motor drive control device pertaining to the twentieth aspect of the present invention, the brushless DC motor can start up without being affected by the position detecting units that is abnormal.

According to the motor drive control device pertaining to the twenty-first aspect of the present invention, the user can know trouble is arising in the position detecting units.

According to the motor drive control device pertaining to the twenty-second aspect of the present invention, the motor drive control device can start up the brushless DC motor by performing the operation described above on the basis of the instruction from the user even when at least one of the position detecting units is abnormal.

BRIEF DESCRIPTION OF THE DRAWINGS

FIG. 3 is a conceptual diagram of a signal decision table 1 that a gate control signal generating unit uses when all position detection signals are not abnormal.

FIG. 4 is a conceptual diagram of a signal decision table 2 that the gate control signal generating unit uses when one position detection signal Hw is abnormal.

DETAILED DESCRIPTION OF EMBODIMENT(S)

<First Embodiment>
(1) Configuration of Entirety and Motor

Figure 1:
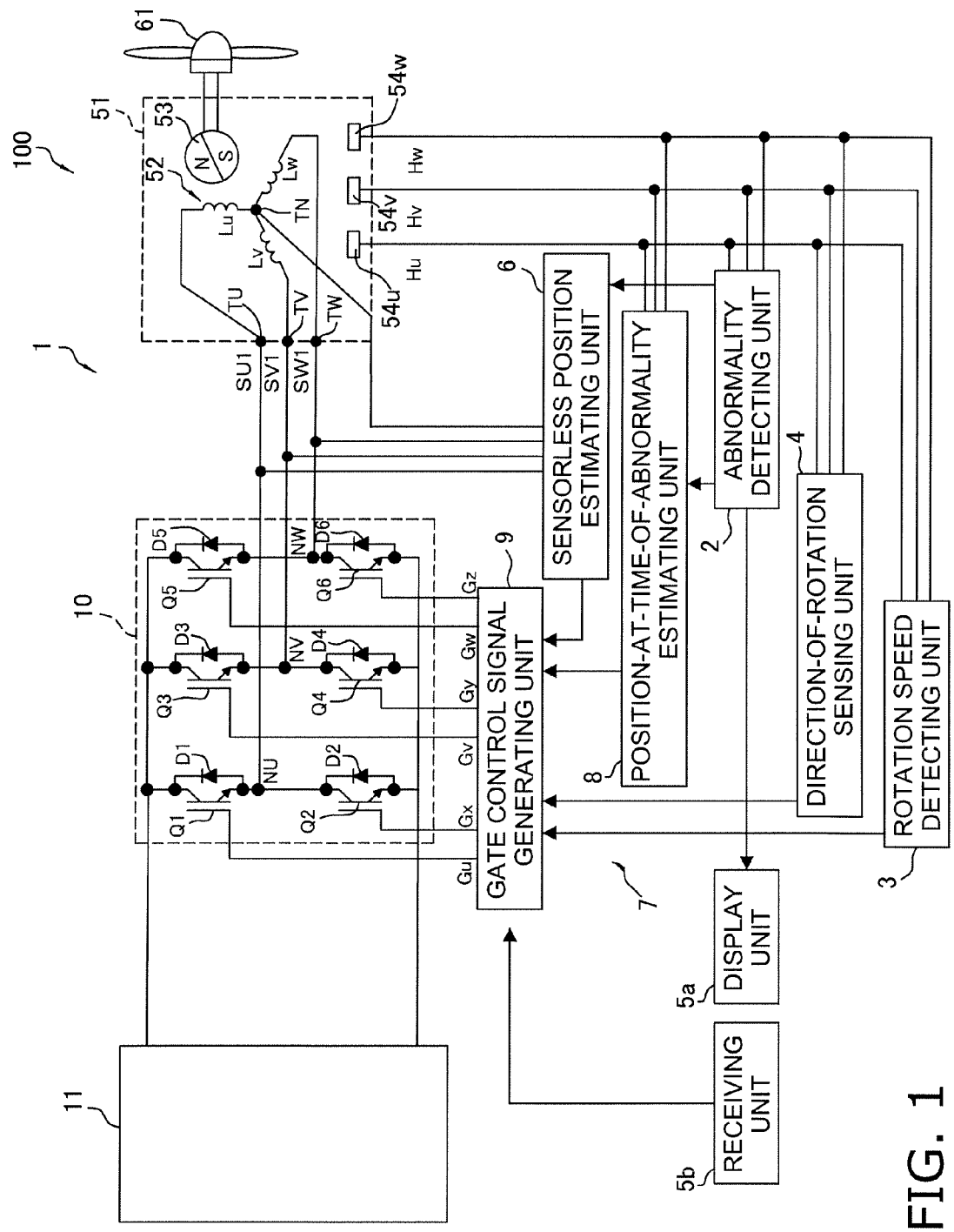
FIG. 1 is a block diagram showing the configuration of the entirety of a system where a motor drive control device pertaining to a first embodiment is employed and the internal configuration of the motor drive control device.

FIG. 1 is a configuration diagram of the entirety of a motor drive control system 100 including a brushless DC motor 51 and a motor drive control device 1 for controlling the driving of this brushless DC motor 51. The brushless DC motor 51 is a fan motor used as a drive source of a propeller fan 61 in an outdoor unit X3 of an air conditioning apparatus X1 of FIG. 2 and is equipped with a stator 52, a rotor 53, and three Hall ICs 54$u$, 54$v$ and 54$w$ (which correspond to position detecting units). Hereinafter, in order to simplify description, the brushless DC motor 51 will simply be called "the motor 51".

The stator 52 includes U-phase, V-phase and W-phase drive coils Lu, Lv and Lw that are star-connected. One ends of the U-phase, V-phase and W-phase drive coils Lu, Lv and Lw are respectively connected to U-phase, V-phase and W-phase drive coil terminals TU, TV and TW, and other ends of these are all connected to a terminal TN. These 3-phase drive coils Lu, Lv and Lw generate induced voltages Vun, Vvn and Vwn (FIG. 6) corresponding to the speed of rotation of the rotor 53 and the position of the rotor 53 as a result of the rotor 53 rotating.

The rotor 53 includes a permanent magnet of two poles comprising an N pole and an S pole and rotates about an axis of rotation with respect to the stator 52. The rotation of the rotor 53 is outputted to the propeller fan 61 via an output shaft (not shown) that lies on the same axial center as this axis of rotation.

Figure 6:
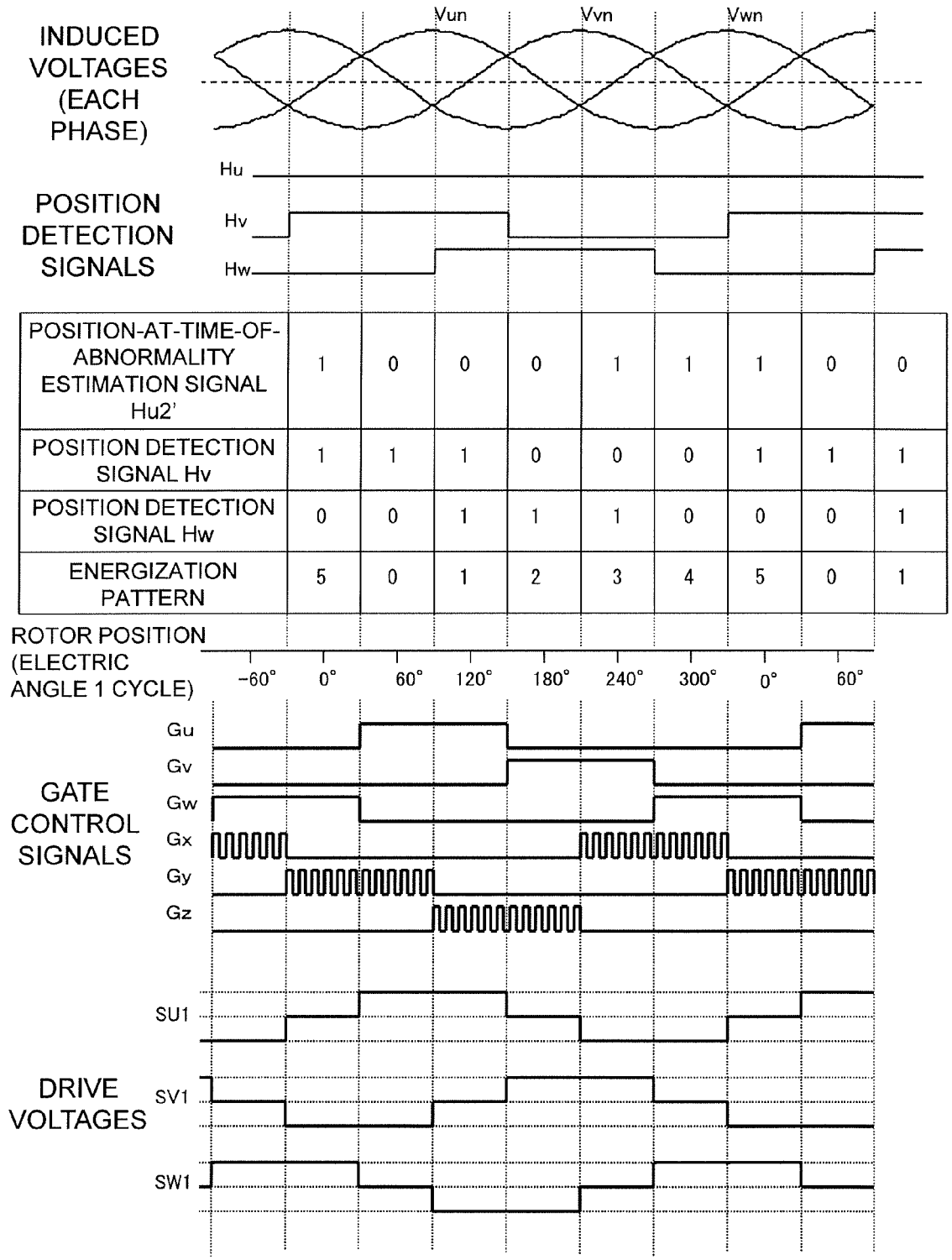
FIG. 6 is a timing chart of each signal when a motor has been rotated in a forward direction by the motor drive control device pertaining to the first embodiment.

The three Hall ICs 54$u$ to 54$w$ are disposed so as to correspond respectively to the drive coils Lu, Lv and Lw. Each of the Hall ICs 54$u$ to 54$w$ detects the position of the rotor 53 with respect to the stator 52 on the basis of magnetic flux arising because of the permanent magnet of the rotor 53. Hereinafter, signals representing the position of the rotor 53 that the Hall ICs 54$u$ to 54$w$ respectively detect will be called position detection signals Hu, Hv and Hw. The position detection signals Hu to Hw are, as shown in FIG. 6, square waves representing "0" or "1" and are outputted to the motor drive control device 1.

(2) Configuration of Motor Drive Control Device

Next, the configuration of the motor drive control device 1 pertaining to the present embodiment will be described. The motor drive control device 1 of the present embodiment is, as shown in FIG. 1, equipped with an abnormality detecting unit 2, a rotation speed detecting unit 3, a direction-of-rotation sensing unit 4, a display unit 5$a$, a receiving unit 5$b$ (which corresponds to an instruction receiving unit), a sensorless position estimating unit 6, and a drive voltage generating unit 7.

<Abnormality Detecting Unit>

The abnormality detecting unit 2 detects abnormality of the position detection signals Hu to Hw respectively and judges each of the Hall ICs 54u to 54w in which trouble such as a fault has arisen. Here, examples of methods of detecting abnormality of each of the position detection signals Hu to Hw include a method of judging whether or not the position detection signals Hu to Hw that normally should be outputted are being outputted by performing a logical operation in regard to each of the position detection signals Hu to Hw that are outputted on the basis of the positions of the Hall ICs 54u to 54w and a method of checking for abnormality of the position detection signals Hu to Hw by direct-current excitation of the motor 51. In the present embodiment, there will be taken as an example a case where the abnormality detecting unit 2 uses the former method of the methods described above such that it is capable of judging whether or not trouble is arising in each of the Hall ICs 54u to 54w not only when the motor 51 is rotating but also before the motor 51 performs normal rotation (that is, before startup of the motor 51).

<Rotation Speed Detecting Unit>

The rotation speed detecting unit 3 measures the rotation speed of the rotor 53 in the motor 51 using the position detection signals Hu to Hw outputted from each of the Hall ICs 54u to 54w. In particular, when there is the position detection signals Hu to Hw that have been judged as abnormal by the abnormality detecting unit 2, the rotation speed detecting unit 3 pertaining to the present embodiment detects the rotation speed of the rotor 53 in the motor 51 using at least one of the remaining position detection signals Hu, Hv and Hw (that is, the position detection signals Hu to Hw outputted from the Hall ICs 54u to 54w that are normal and in which trouble is not arising) excluding the position detection signals Hu, Hv or Hw that have been detected as abnormal. For example, when the position detection signal Hu is abnormal, the rotation speed detecting unit 3 detects the rotation speed of the rotor 53 in the motor 51 using the position detection signals Hv and Hw. Further, when none of the position detection signals Hu to Hw have been detected as abnormal by the abnormality detecting unit 2, the rotation speed detecting unit 3 detects the rotation speed of the rotor 53 in the motor 51 on the basis of all of the position detection signals Hu to Hw.

Hereinafter, in order to simplify description, the rotation speed of the rotor 53 in the motor 51 will simply be called "the rotation speed of the motor 51".

<Direction-of-Rotation Sensing Unit>

The direction-of-rotation sensing unit 4 senses the direction of rotation of the rotor 53 in the motor 51 using the position detection signals Hu to Hw outputted from each of the Hall ICs 54u to 54w. In particular, the direction-of-rotation sensing unit 4 pertaining to the present embodiment detects the direction of rotation of the rotor 53 in the motor 51 using, like the rotation speed detecting unit 3, the remaining position detection signals Hu to Hw excluding the position detection signal Hu, Hv or Hw that has been detected as abnormal by the abnormality detecting unit 2. For example, when the position detection signal Hu is abnormal, the direction-of-rotation sensing unit 4 senses the direction of rotation of the rotor 53 in the motor 51 using the position detection signals Hv and Hw. When none of the position detection signals Hu to Hw have been detected as abnormal by the abnormality detecting unit 2, the direction-of-rotation sensing unit 4 detects the direction of rotation of the rotor 53 in the motor 51 on the basis of all of the position detection signals Hu to Hw.

Hereinafter, in order to simplify description, the direction of rotation of the rotor 53 in the motor 51 will, like the rotation speed of the motor 51, simply be called "the direction of rotation of the motor 51".

<Display Unit and Receiving Unit>

Figure 2:
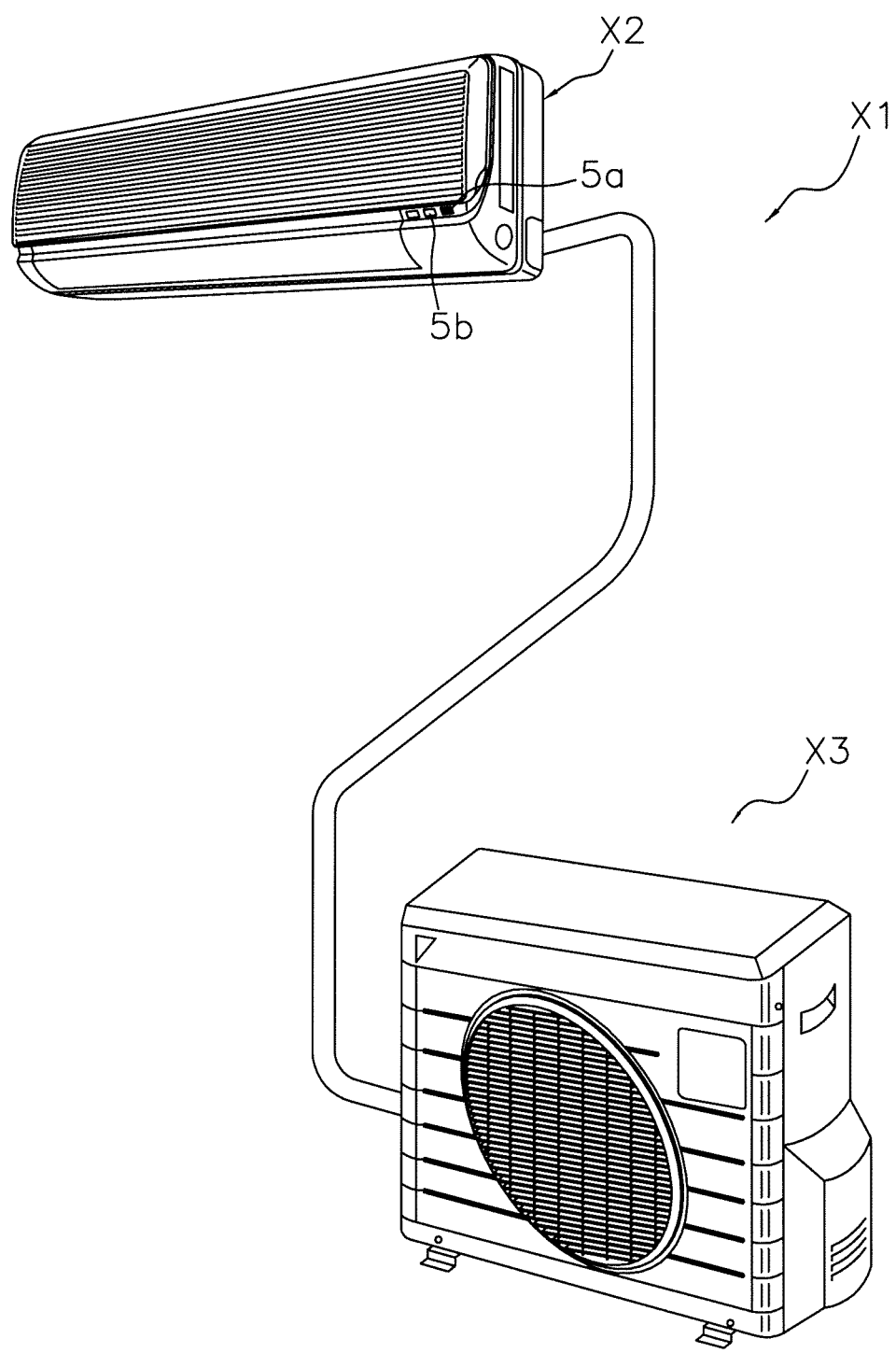
FIG. 2 is an external view of an air conditioning apparatus where a fan motor driven and controlled by the motor drive control device pertaining to the present embodiment is employed.

The display unit 5a is for displaying that the abnormality detecting unit 2 has detected abnormality of the position detection signals Hu to Hw and is disposed in an indoor unit X2 of the air conditioning apparatus X1 as shown in FIG. 2. The display unit 5a is configured by an LED, for example, and performs lighting and blinking when abnormality has been detected in even one of the position detection signals Hu to Hw. Further, the display unit 5a may also change the color that it lights between when all of the position detection signals Hu to Hw are normal and when one or more of the position detection signals Hu to Hw is abnormal. Thus, the user of the indoor unit X2 can know there is abnormality in the Hall ICs 54u to 54w.

The receiving unit 5b is, like the display unit 5a, disposed in the indoor unit X2 of the air conditioning apparatus X1 as shown in FIG. 2. The receiving unit 5b can receive various types of operation instructions from the user that are given via a remote controller. In particular, the receiving unit 5b pertaining to the present embodiment can receive an instruction to execute the operation of the drive voltage generating unit 7 and an instruction to stop the operation of the drive voltage generating unit 7. Here, the instruction to execute the operation of the drive voltage generating unit 7 refers to an operation whereby the drive voltage generating unit 7 generates drive voltages SU1 to SW1 on the basis of at least one of the remaining position detection signals Hu to Hw excluding the position detection signal Hu to Hw that been detected as abnormal. This operation will be described later under "<Drive Voltage Generating Unit>".

<Sensorless Position Estimating Unit>

The sensorless position estimating unit 6 is for detecting the position of the rotor 53 that is used when driving the motor 51 with a so-called sensorless system and includes a position detection comparator and the like. For example, the sensorless position estimating unit 6 detects the position of the rotor 53 with respect to the stator 52 on the basis of the induced voltages Vun to Vwn generated in the motor 51 and a neutral voltage of the motor 51 (specifically, the voltage of the terminal TN of the motor 51). That is, the sensorless position estimating unit 6 estimates the position of the rotor 53 without using the position detection signals Hu to Hw.

The sensorless position estimating unit 6 may also function when all of the position detection signals Hu to Hw have been detected as abnormal by the abnormality detecting unit 2 while the motor 51 is performing normal rotation. Further, the sensorless position estimating unit 6 may also perform position estimation of the rotor 53 regardless of the state of abnormality of the position detection signals Hu to Hw. In the present embodiment, there will be taken as an example a case where the sensorless position estimating unit 6 functions when all of the position detection signals Hu to Hw have been detected as abnormal.

Further, hereinafter, signals representing the position of the rotor 53 that has been estimated by the sensorless position estimating unit 6 will be called sensorless position estimation signals Hu1', Hv1' and Hw1'.

<Drive Voltage Generating Unit>

The drive voltage generating unit 7 generates and outputs to the motor 51 drive voltages SU1, SV1 and SW1 for driving and controlling the motor 51. In particular, the drive voltage generating unit 7 pertaining to the present embodiment can drive the motor 51 even when abnormality of at least one of the position detection signals Hu to Hw has been detected by the abnormality detecting unit 2, and the drive voltage generating unit 7 has a position-at-time-of-abnormality estimating unit 8, a gate control signal generating unit 9 and an output circuit 10.

The operation of the drive voltage generating unit 7 described below may be performed automatically when abnormality has been detected in the position detection signals Hu to Hw or may be performed when the receiving unit 5b has received an operation instruction from the user.

<Position-at-Time-of-Abnormality Estimating Unit>

The position-at-time-of-abnormality estimating unit 8 estimates the position of the rotor 53 using at least one of the remaining position detection signals Hu to Hw excluding the position detection signal Hu, Hv or Hw that has been detected as abnormal. In particular, the position-at-time-of-abnormality estimating unit 8 performs position estimation of the rotor 53 when one or two of the position detection signals Hu to Hw has been detected as abnormal by the abnormality detecting unit 2.

For example, when the position detection signal Hu is abnormal, the position-at-time-of abnormality estimating unit 8 calculates the speed of rotation of the rotor 53 on the basis of the amount of time in which each of the position detection signals Hv and Hw changes and estimates the position of the rotor 53 at the place corresponding to the drive coil Lu on the basis of this speed of rotation of the rotor 53. Hereinafter, signals representing the position of the rotor 53 that has been estimated by the position-at-time-of-abnormality estimating unit 8 in this manner will be called position-at-time-of-abnormality estimation signals Hu2', Hv2' and Hw2'.

Here, the position-at-time-of-abnormality estimation signals Hu2' to Hw2' can be signals representing the position (that is, the electric angle) of the rotor 53 or can be signals representing "0" or "1" like the position detection signals Hu to Hw, but in the present embodiment, there will be described a case where the position-at-time-of-abnormality estimation signals Hu2' to Hw2' are signals of "0" or "1".

<Gate Control Signal Generating Unit>

The gate control signal generating unit 9 is configured by a microcomputer including a CPU and a memory, for example, and generates gate control signals Gu, Gx, Gv, Gy, Gw and Gz for switching ON and OFF insulated gate bipolar transistors Q1 to Q6 (described later) in the output circuit 10 such that the drive voltages SU1 to SW1 corresponding to the rotation speed and the direction of rotation of the rotor 53 are outputted to the motor 51. In particular, the gate control signal generating unit 9 pertaining to the present embodiment varies its method of generating the gate control signals Gu to Gz depending on the detection result resulting from the abnormality detecting unit 2.

Here, how the gate control signal generating unit 9 pertaining to the present embodiment generates the gate control signals Gu to Gz will be described. In the memory configuring the gate control signal generating unit 9, there are stored a control program for the CPU to decide the gate control signals Gu to Gz and signal decision tables 1 and 2 that are used when the gate control signals Gu to Gz are generated. FIG. 3 is one example of the signal decision table 1 that is used when there is no abnormality in all of the position detection signals Hu to Hw, and in this signal decision table 1, correspondences are established between the position detection signals Hu to Hw and the gate control signals Gu to Gz.

FIG. 4 is one example of the signal decision table 2 that is used when it has been judged that the position detection signal Hw is abnormal, and in this signal decision table 2, correspondences are established between the position detection signals Hu and Hv, the position-at-time-of-abnormality estimation signal Hw2' and the gate control signals Gu to Gz.

First, when abnormality has not been detected in the position detection signals Hu to Hw, the gate control signal generating unit 9 applies each of the position detection signals Hu to Hw to the signal decision table 1 of FIG. 2 and generates the gate control signals Gu to Gz.

When one or two of the position detection signals Hu to Hw is abnormal, the gate control signal generating unit 9 selects the signal decision table on the basis of the position detection signal Hu to Hw that is abnormal, applies the position detection signals Hu to Hw that are normal and the position-at-time-of-abnormality estimation signal Hu2' to Hw2' to the signal decision table 2 it has selected, and generates the gate control signals Gu to Gz. For example, when only the one position detection signal Hw is abnormal, the signal decision table 2 of FIG. 3 is selected. In this case, the gate control signal generating unit 9 generates the gate control signals Gu to Gz with the position-at-time-of-abnormality estimation signal Hw2' that serves as a replacement for the position detection signal Hw, the position detection signals Hu and Hv that are normal, and the signal decision table 2 it has selected.

Additionally, when all three of the position detection signals Hu to Hw are abnormal, the gate control signal generating unit 9 generates the gate control signals Gu to Gz using the sensorless position estimation signals Hu1' to Hw1' that have been estimated by the sensorless position estimating unit 6 without using the position detection signals Hu to Hw.

Further, the gate control signal generating unit 9 also adjusts the gate control signals Gu to Gz depending on the rotation speed of the motor 51 that has been outputted from the rotation speed detecting unit 3. Thus, gate control signals Gu to Gz corresponding to the rotation speed of the motor 51 at those times are generated and outputted to the insulated gate bipolar transistors Q1 to Q6.

<Output Circuit>

The output circuit 10 includes the insulated gate bipolar transistors (hereinafter simply called "transistors") Q1 to Q6 and reflux-use diodes D1 to D6. The transistors Q1 and Q2, Q3 and Q4, and Q5 and Q6 are connected in series between a power supply line to which a power supply voltage from a power supply unit 11 is supplied and a GND line. Nodes NU, NV and NW between the transistors Q1 and Q2, Q3 and Q4, and Q5 and Q6 are respectively connected to the U-phase, V-phase and W-phase drive coil terminals TU, TV and TW of the motor 51. The diodes D1 to D6 have the characteristic that they become conductive when a reverse voltage has been applied to each of the transistors Q1 to Q6 and are connected in parallel to each of the transistors Q1 to Q6.

According to the output circuit 10 having this configuration, the transistors Q1 to Q6 are switched ON and OFF on the basis of the gate control signals Gu to Gz applied to each of the gate terminals, whereby the drive voltages SU1 to SW1 are generated and outputted to each of the drive coils Lu to Lw.

(3) Operation of Motor Drive Control Device (3-1) Overall Control Operation

Figure 5:
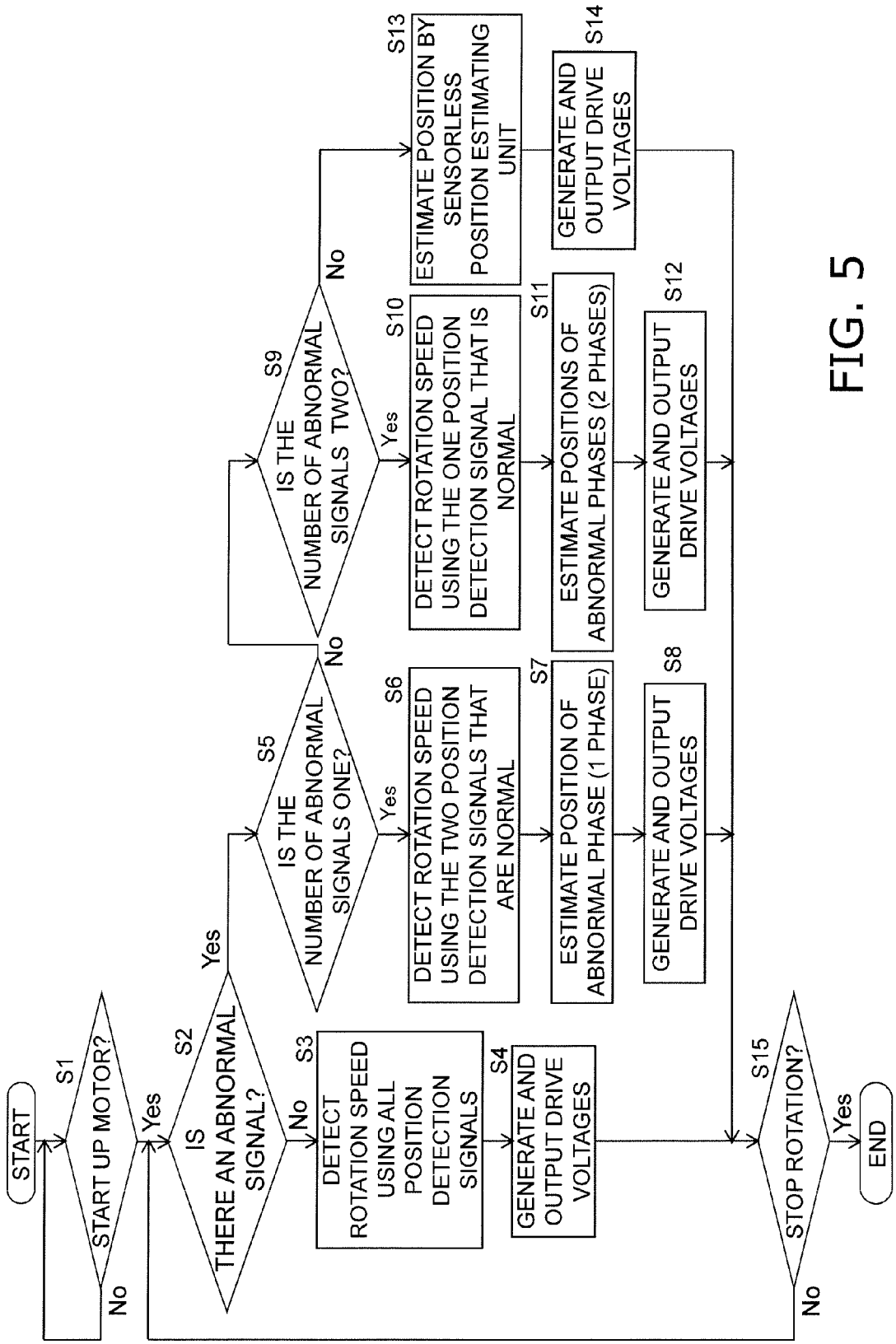
FIG. 5 is a flowchart showing a flow of a control operation that the motor drive control device pertaining to the first embodiment performs.

FIG. 5 is a flowchart showing a flow of a control operation that the motor drive control device 1 performs. Hereinafter, there will be taken as an example a case where, when one or two of the position detection signals Hu to Hw is abnormal, the rotation speed and the direction of rotation of the motor 51 and the position estimation signals Hu' to Hw' are detected and generated from all of the position detection signals Hu to Hw that are normal. Here, there will be taken as an example a case where the operation of the drive voltage generating unit 7 described below is performed automatically when abnormality has been detected in the position detection signals Hu to Hw.

Step S1: When the motor drive control device 1 acquires an instruction to start up the motor 51 from outside the motor drive control device 1 such as the outdoor unit X3 of the air conditioning apparatus X1, for example, it generates and outputs to the motor 51 the drive voltages SU1 to SW1 (S1). Thus, the motor 51 starts up.

Steps S2 to S4: When abnormality is not detected in all of the position detection signals Hu to Hw of the three phases (NO in S2), the rotation speed detecting unit 3 and the direction-of-rotation sensing unit 4 detect the rotation speed and the direction of rotation of the motor 51 using all of the position detection signals Hu to Hw (S3). The gate control signal generating unit 9 of the drive voltage generating unit 7 generates the gate control signals Gu to Gz on the basis of all of the position detection signals Hu to Hw and the rotation speed of the motor 51 and the like, and outputs these to each of the transistors Q1 to Q6 of the output circuit 10. Thus, each of the transistors Q1 to Q6 is switched ON and OFF by the gate control signals Gu to Gz, and the drive voltages SU1 to SW1 that have been outputted from the output circuit 10 are applied to each of the drive coils Lu to Lw inside the motor 51 (S4).

Steps S5 to S8: When a position detection signal of one phase of the position detection signals Hu to Hw of the three phases has been detected as abnormal (YES in S5), the rotation speed detecting unit 3 and the direction-of-rotation sensing unit 4 detect the rotation speed and the direction of rotation of the motor 51 using the signals (that is, the position detection signals of the two phases that are normal) excluding the position detection signal of the one phase that has been detected as abnormal (S6). The position-at-time-of-abnormality estimating unit 8 of the drive voltage generating unit 7 estimates the position of the rotor 53 of the one phase that is abnormal on the basis of the position detection signals Hu to Hw of the two phases that are normal and outputs the position-at-time-of-abnormality estimation signal Hu2' to Hw2' (S7). Then, the gate control signal generating unit 9 generates the gate control signals Gu to Gz on the basis of the position detection signals Hu to Hw of the two phases that are normal, the position-at-time-of-abnormality estimation signal Hu2' to Hw2' of the one phase, and the rotation speed of the motor 51. Thus, each of the transistors Q1 to Q6 of the output circuit 10 is switched ON and OFF on the basis of the gate control signals Gu to Gz, and the drive voltages SU1 to SW1 not accompanied by the abnormal position detection signal Hu to Hw are outputted to each of the drive coils Lu to Lw inside the motor 51 (S8).

Steps S9 to S12: When the position detection signals Hu to Hw of two phases of the position detection signals Hu to Hw of the three phases have been detected as abnormal (YES in S9), the rotation speed detecting unit 3 and the direction-of-rotation sensing unit 4 detect the rotation speed and the direction of rotation of the motor 51 using the signal (that is, the position detection signal of the one phase that is normal) excluding the position detection signals of the two phases that have been detected as abnormal (S10). The position-at-time-of abnormality estimating unit 8 estimates the position of the rotor 53 of the two phases that are abnormal on the basis of the position detection signal Hu to Hw of the one phase that is normal and outputs the position-at-time-of-abnormality estimation signals Hu2' to Hw2' of the two phases (S11). Then, the gate control signal generating unit 9 generates the gate control signals Gu to Gz on the basis of the position detection signal Hu to Hw of the one phase that is normal, the position-at-time-of-abnormality estimation signals Hu2' to Hw2' of the two phases, and the rotation speed of the motor 51. Thus, each of the transistors Q1 to Q6 of the output circuit 10 is switched ON and OFF on the basis of the gate control signals Gu to Gz, and the drive voltages SU1 to SW1 not accompanied by the abnormal position detection signals Hu to Hw are outputted to each of the drive coils Lu to Lw inside the motor 51 (S12).

Steps S13 to S14: When all of the position detection signals Hu to Hw of the three phases have been detected as abnormal (NO in S9), the sensorless position estimating unit 6 estimates the position of the rotor 53 without using the position detection signals Hu to Hw and outputs the sensorless position estimation signals Hu1' to Hw1' of the three phases (S13). Then, the gate control signal generating unit 9 generates the gate control signals Gu to Gz on the basis of the sensorless position estimation signals Hu1' to Hw1'. Thus, the drive voltages SU1 to SW1 based on sensorless driving are outputted to the motor 51 (S14).

Step S15: The motor drive control device 1 repeats the operation from step S2 on until it acquires an instruction to stop the rotation of the motor 51 from outside the motor drive control device 1 (NO in S15). When the motor drive control device 1 has acquired an instruction to stop the rotation of the motor 51 (YES in S15), the motor drive control device 1 stops the rotation of the motor 51 and ends the series of operations.

(3-2) Specific Example of Motor Control Operation by Motor Drive Control Device

Next, one example where the motor drive control device 1 controls the driving of the motor 51 will be briefly described. FIG. 6 is a timing chart showing each signal that the motor drive control device 1 outputs and the induced voltages Vun to Vwn generated in each of the drive coils Lu to Lw of the motor 51 when trouble has arisen in the Hall IC 54u. As for the gate control signals Gu to Gz in FIG. 6, "H" represents when they are "ON" and "L" represents when they are "OFF".

When trouble arises in the Hall IC 54u, the position detection signal Hu outputted from the Hall IC 54u becomes fixed at either "H" or "L". FIG. 6 shows a case where the position detection signal Hu is fixed at "H". In this case, the abnormality detecting unit 2 detects abnormality of the position detection signal Hu. The position-at-time-of-abnormality estimating unit 8 estimates the position of the rotor 53 on the basis of the position detection signals Hv and Hw that are normal and outputs the position-at-time-of-abnormality estimation signal Hu2'. Next, the gate control signal generating unit 9 generates and outputs to each of the transistors Q1 to Q6 of the output circuit 10 the gate control signals Gu to Gz on the basis of the position-at-time-of-abnormality estimation signal Hu2' that has been estimated and the position detection signals Hv and Hw. Thus, the same drive voltages SU1 to SW1 as when the position detection signals Hu to Hw are normal are outputted to the motor 51 as shown in FIG. 6.

(4) Effects (A)

When, because trouble such as a fault has arisen in at least one of the Hall ICs 54u to 54w, there is abnormality in the position detection signal Hu to Hw outputted from that Hall IC 54u to 54w, the motor drive control device 1 pertaining to the present embodiment generates the drive voltages SU1 to SW1 on the basis of at least one of the position detection signals Hu to Hw that are normal and outputs the drive voltages SU1 to SW1 to the motor 51. In this manner, the drive voltages SU1 to SW1 are generated without the position detection signal Hu to Hw that is abnormal being used, so the motor 51 can stably rotate without being affected by the position detection signal Hu to Hw that is abnormal.

(B)

Further, according to the motor drive control device 1, the drive voltages SU1 to SW1 are generated using the position-at-time-of-abnormality estimation signals Hu2' to Hw2' that have been estimated using the position detection signals Hu to Hw that are normal instead of the drive voltages SU1 to SW1 being generated using the position detection signal Hu to Hw that is abnormal. Thus, the motor 51 can perform rotation more stably.

(C)

Further, according to the motor drive control device 1, the rotation speed of the motor 51 is detected using the position detection signals Hu to Hw that are normal, and the drive voltages SU1 to SW1 are generated on the basis of this rotation speed of the motor 51. For that reason, rotation-speed control of the motor 51 becomes performed more appropriately.

(D)

Further, because the Hall ICs are used as the position detecting units of the motor 51, the position of the rotor can be detected without having to use complicated circuits or operations, so costs can be reduced.

(E)

Further, the motor drive control device 1 estimates the position of the rotor without using the position detection signals Hu to Hw and generates the drive voltages SU1 to SW1 when trouble is arising in all of the Hall ICs 54$u$ to 54$w$. Consequently, the motor 51 can continue rotation without being affected by the position detection signals Hu to Hw outputted from the Hall ICs 54$u$ to 54$w$ in which the trouble is arising.

(F)

Further, the motor drive control device 1 is equipped with the display unit 5$a$ that display that the abnormality detecting unit 2 has detected abnormality of the position detection signals Hu to Hw, so the user can know trouble is arising in the Hall ICs 54$u$ to 54$w$.

(G)

Further, the motor drive control device 1 is equipped with the receiving unit 5$b$ that can receive an instruction to execute the operation described above resulting from the drive voltage generating unit 7. Consequently, the user can select whether or not to have the drive voltage generating unit 7 perform the operation described above and can issue an instruction to the drive voltage generating unit 7 via the remote controller even when abnormality has arisen in the Hall ICs 54$u$ to 54$w$ and an information that abnormality has been detected is being displayed on the display unit 5$a$. Further, the motor drive control device 1 can drive the brushless DC motor 51 by performing the operation of generating the drive voltages SU1 to SW1 described above on the basis of the instruction from the user even when at least one of the position detection signals Hu to Hw is abnormal.

(5) Modification

In the embodiment described above, the motor 51 can be more reliably rotated by using the following method when the specifications of the Hall ICs 54$u$ to 54$w$ are unclear or when it is unclear to which ports in the gate control signal generating unit 9 the position detection signals Hu to Hw outputted from each of the Hall ICs 54$u$ to 54$w$ are inputted.

Figure 7:
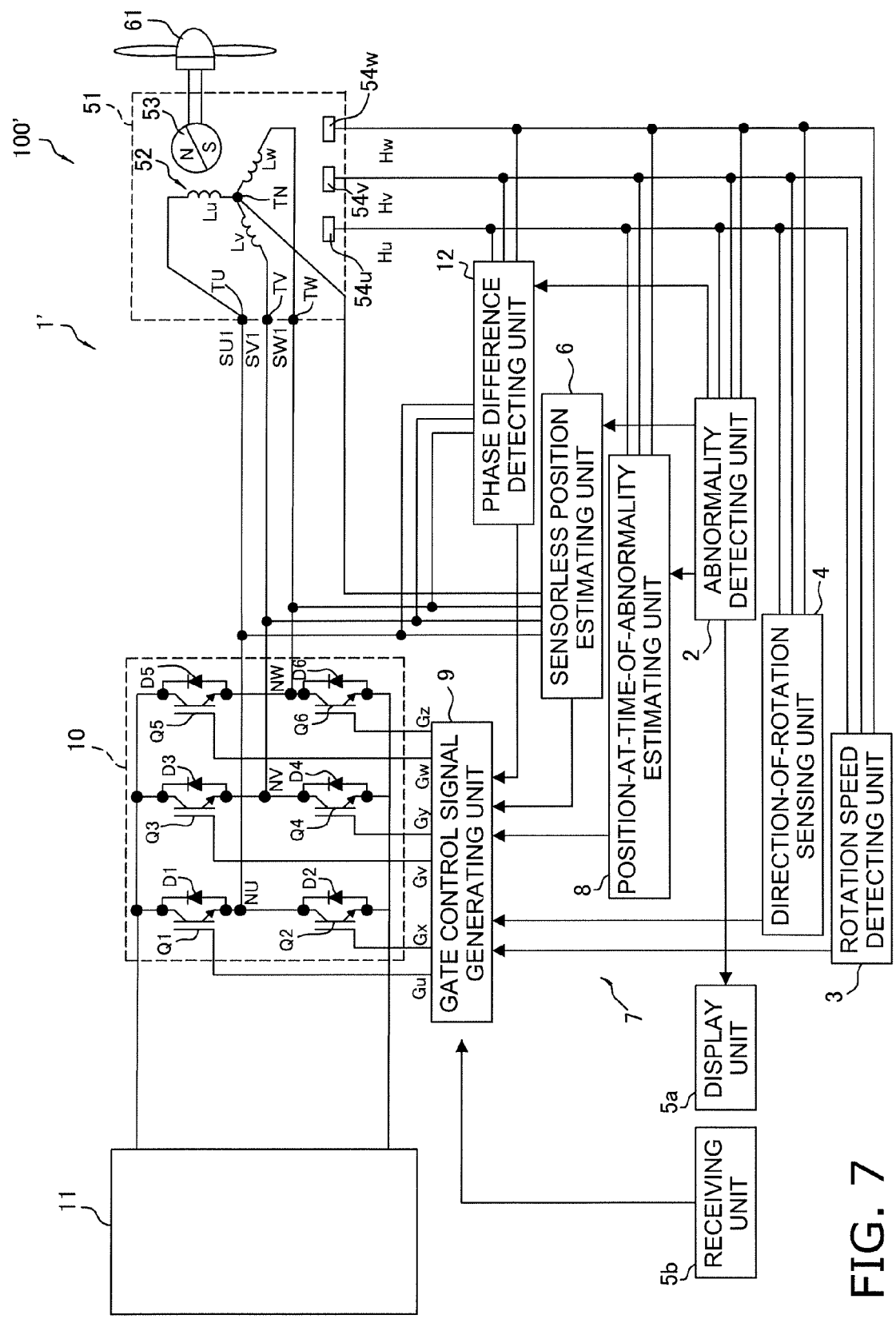
FIG. 7 is a block diagram showing the configuration of the entirety of a system where a motor drive control device pertaining to a modification of the first embodiment is employed and the internal configuration of the motor drive control device.

FIG. 7 is a configuration diagram of the entirety of a motor drive control system 100' including a motor drive control device 1' pertaining to a modification of the first embodiment and a motor 51 that is driven and controlled by this motor drive control device 1'. The motor drive control device 1' is equipped with a phase difference detecting unit 12 in addition to the configuration of the motor drive control device 1 of FIG. 1. In FIG. 7, configurations other than the phase difference detecting unit 12 are the same as the configurations in the motor drive control system 100 of FIG. 1, so the same reference numerals as those in FIG. 1 will be given thereto and description thereof will be omitted.

The phase difference detecting unit 12 detects phase differences between the remaining position detection signals Hu to Hw (that is, the position detection signals Hu to Hw that are normal) excluding the position detection signal Hu to Hw that has been detected as abnormal and the induced voltages Vun to Vwn generated in the drive coils Lu to Lw of the motor 51 corresponding to the position detection signals Hu to Hw that are normal. For example, when the position detection signal Hu is abnormal, the phase difference detecting unit 12 detects phase differences between the position detection signals Hv and Hw and the induced voltages Vvn and Vwn generated in the drive coils Lv and Lw of the motor 51. Here, the phase difference detecting unit 12 pertaining to the present modification detects a phase difference when one or two of the Hall ICs 54$u$ to 54$w$ of the three Hall ICs 54$u$ to 54$w$ is abnormal.

Additionally, the gate control signal generating unit 9 generates the gate control signals Gu to Gz on the basis of the phase differences that have been detected by the phase difference detecting unit 12 and polarities of the position detection signals Hu to Hw that are normal. For example, when the position detection signal Hu is abnormal, the gate control signal generating unit 9 generates the gate control signals Gu to Gz on the basis of the phase differences relating to the position detection signals Hv and Hw and the polarities of the position detection signals Hv and Hw. In this case, the drive voltages SU1, SV1 and SW1 based on the phase differences relating to the position detection signals Hv and Hw and the polarities of the position detection signals Hv and Hw are outputted from the output circuit 10.

Thus, even if trouble were to arise in the Hall ICs 54$u$ to 54$w$ when the specifications of the Hall ICs 54$u$ to 54$w$ are unclear, the motor 51 can rotate normally without being affected by the Hall IC 54$u$ to 54$w$ in which the trouble has arisen.

When all of the Hall ICs 54$u$ to 54$w$ are faulty, the position of the rotor 53 is estimated by the sensorless position estimating unit 6 and the motor 51 is driven on the basis of this estimated position like in the first embodiment.

<Second Embodiment>

Figure 8:
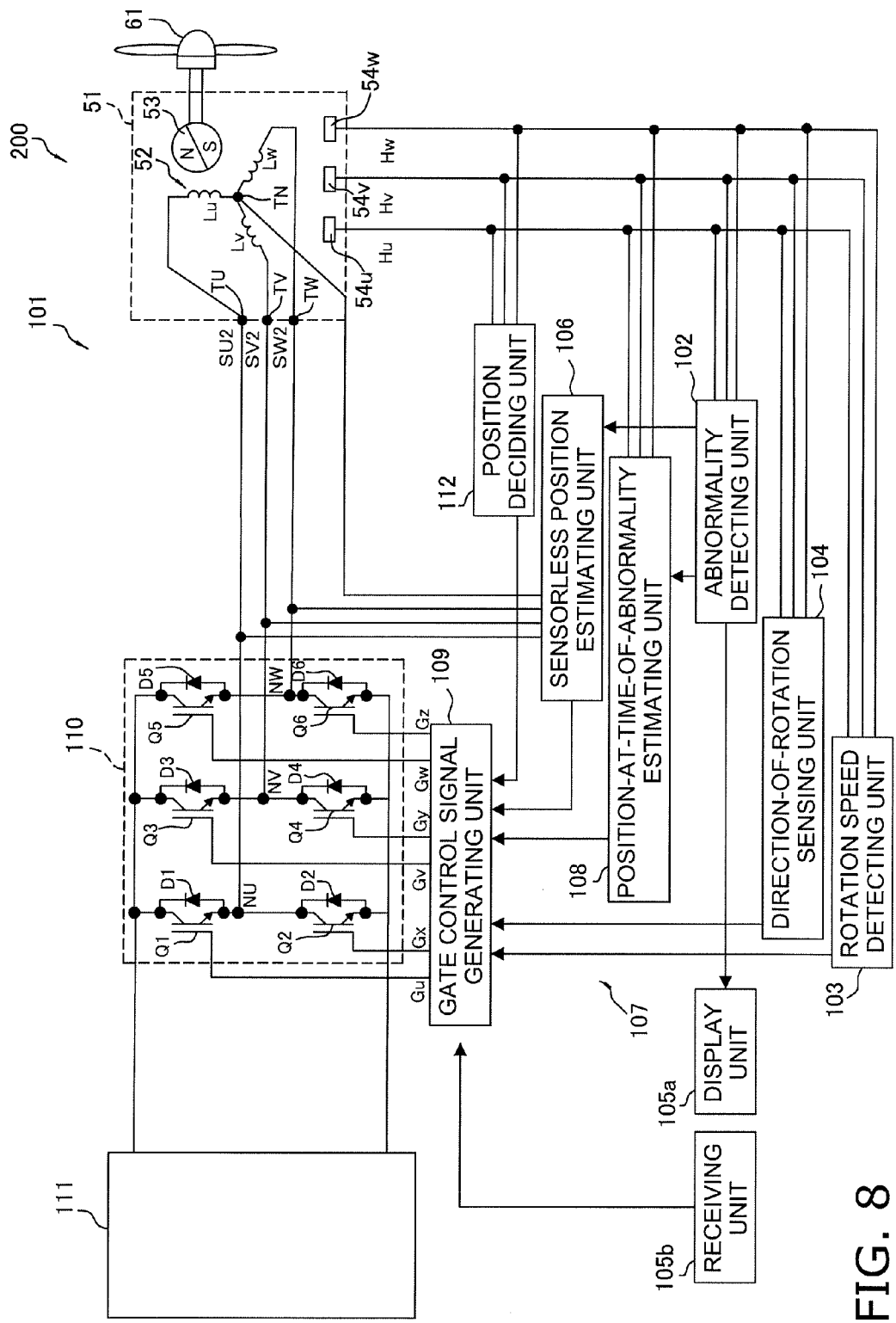
FIG. 8 is a block diagram showing the configuration of the entirety of a system where a motor drive control device pertaining to a second embodiment is employed and the internal configuration of the motor drive control device.

In the first embodiment described above, there has been described a method of driving and controlling the motor 51 when abnormality has arisen in the Hall ICs 54$u$ to 54$w$ while the motor 51 is rotating, but in a second embodiment, there will be described a method that can reliably start up the motor 51 when there is abnormality in at least one of the Hall ICs already from before startup of the motor 51. FIG. 8 is a configuration diagram of the entirety of a motor drive control system 200 including a motor drive control device 101 pertaining to the second embodiment and a motor 51 that is driven and controlled by this motor drive control device 101.

Here, the motor 51 pertaining to the present embodiment has the same configuration as that of the motor 51 of the first embodiment, so the same reference numerals as in FIG. 1 will be given thereto. That is, the motor 51 is a fan motor for an outdoor unit and is a 3-phase brushless DC motor equipped with a stator 52 including U-phase, V-phase and W-phase drive coils Lu to Lw, a rotor 53 having plural magnetic poles, and three Hall ICs 54$u$ to 54$w$.

(1) Configuration of Motor Drive Control Device

The motor drive control device 101 is equipped with an abnormality detecting unit 102, a rotation speed detecting unit 103, a direction-of-rotation sensing unit 104, a display unit 105a, a receiving unit 105b (which corresponds to an instruction receiving unit), a sensorless position estimating unit 106, a drive voltage generating unit 107 (which corresponds to a fixed voltage generating unit and a drive voltage generating unit), and a position deciding unit 112. The drive voltage generating unit 107 has a position-at-time-of-abnormality estimating unit 108, a gate control signal generating unit 109, and an output circuit 110. The abnormality detecting unit 102, the rotation speed detecting unit 103, the direction-of-rotation sensing unit 104, the display unit 105a, the sensorless position estimating unit 106, and the position-at-time-of-abnormality estimating unit 108 and the output circuit 110 of the drive voltage generating unit 107 have the same configurations as those of the abnormality detecting unit 2, the rotation speed detecting unit 3, the direction-of-rotation sensing unit 4, the display unit 5a, the sensorless position estimating unit 6, and the position-at-time-of-abnormality estimating unit 8 and the output circuit 10 of the drive voltage generating unit 7 pertaining to FIG. 1 shown with the same names in the first embodiment, so detailed description thereof will be omitted. Hereinafter, the position deciding unit 112, the gate control signal generating unit 109 and the receiving unit 105b, which are one characteristic of the present embodiment, will be described.

<Position Deciding Unit>

The position deciding unit 112 decides a predetermined position of the rotor 53 such that torque in a direction of forward rotation is generated at a time of application of drive voltages SU2 to SW2 for driving the motor 51 when at least one of the Hall ICs 54u to 54w is abnormal. The abnormality detecting unit 102 pertaining to the present embodiment performs abnormality detection of the Hall ICs 54u to 54w before startup of the motor 51. For that reason, the position deciding unit 112 performs the operation of deciding the predetermined position of the rotor 53 before the motor 51 performs normal rotation, that is, before startup of the motor 51. Further, when abnormality has been detected, an information thereof is displayed on the display unit 105a.

Figure 9:
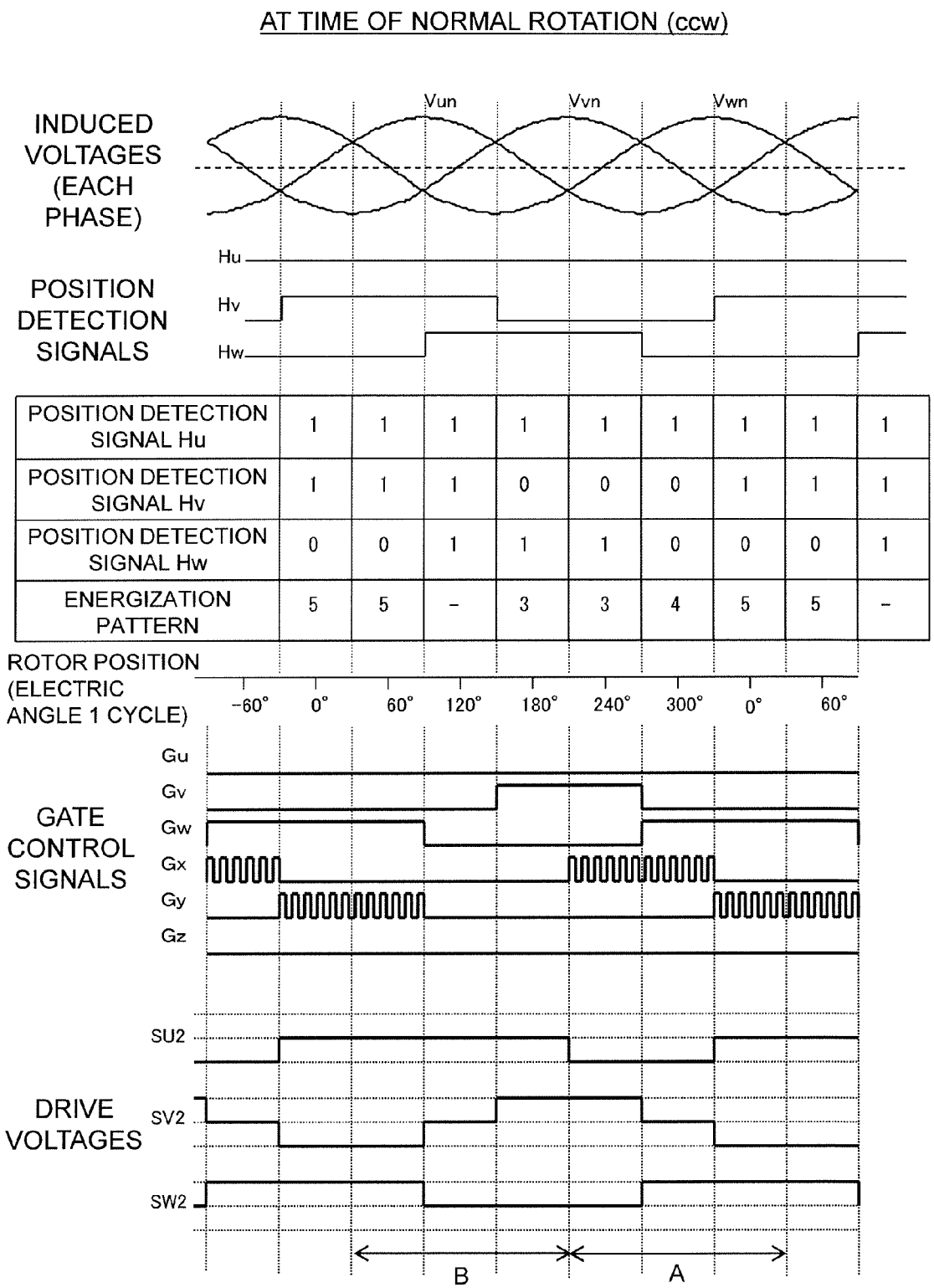
FIG. 9 is a diagram for describing a specific example where a position deciding unit decides a predetermined position.

Here, how the position deciding unit 112 decides the predetermined position of the rotor 53 will be described. For example, when the drive voltages SU2 to SW2 for starting up the motor 51 are generated using all of the position detection signals Hu to Hw at a time when there is abnormality in the position detection signal Hu that the Hall IC 54u outputs, as shown in FIG. 9, unbalanced periods end up arising in the drive voltages SU2 to SW2. Specifically, in FIG. 9, during period A from about 210 degrees to about 30 degrees in the position of the rotor 53, the drive voltages SU2 to SW2 are balanced and torque is generated in the direction of forward rotation, but during period B from about 30 degrees to about 210 degrees in the position of the rotor 53, the drive voltages SU2 to SW2 (in particular, the U-phase and W-phase drive voltages SU2 and SW2) are unbalanced. Thus, in this case, the position deciding unit 112 decides the predetermined position of the rotor 53 to be a position corresponding to about 210 degrees in the position of the rotor 53. That is, the position deciding unit 112 decides the predetermined position of the rotor 53 to be a position where the drive voltages SU2 to SW2 applied to each phase become balanced.

<Gate Control Signal Generating Unit>

The gate control signal generating unit 109 generates the gate control signals Gu to Gz for switching ON and OFF each of the transistors Q1 to Q6 of the output circuit 110.

In particular, when at least one of the Hall ICs 54u to 54w is abnormal, the gate control signal generating unit 109 pertaining to the present embodiment generates and outputs to each of the transistors Q1 to Q6 the gate control signals Gu to Gz so that, before starting up the motor 51, the drive voltages SU2 to SW2 (which correspond to fixed voltages) such that the rotor 53 is fixed in the predetermined position that has been decided by the position deciding unit 112 are outputted to the motor 51. More specifically, before startup of the motor 51, the gate control signal generating unit 109 generates the gate control signals Gu to Gz for so-called direct-current excitation of the rotor 53. Thus, the drive voltages SU2 to SW2 (that is, fixed voltages) for direct-current excitation of the rotor 53 and for moving the position of the rotor 53 into and fixing the position of the rotor 53 in the predetermined position are outputted from the output circuit 110 to the motor 51, and the rotor 53 is fixed in the predetermined position.

Further, the gate control signal generating unit 109 pertaining to the present embodiment decides an energization period of the drive voltages SU2 to SW2 on the basis of a state of normality/abnormality of the position detection signals Hu to Hw. Here, the energization period is a period where the position detection signals Hu to Hw are normal and corresponds to a period where the drive voltages SU2 to SW2 applied to the drive coils Lu to Lw of each phase become balanced. Specifically, in FIG. 9, period A from about 210 degrees to about 30 degrees in the position of the rotor 53 corresponds to a period where the position detection signals Hu to Hw are normal. In this case, the gate control signal generating unit 109 decides the energization period as about 180 degrees.

In this manner, after the rotor 53 moves into and is fixed in the predetermined position and the energization period of the drive voltages SU2 to SW2 has been decided, the gate control signal generating unit 109 generates the gate control signals Gu to Gz corresponding to the drive voltages SU2 to SW2 for starting up the motor 51. At this time, the gate control signal generating unit 109 continues to output the gate control signals Gu to Gz during the energization period. When this happens, the drive voltages SU2 to SW2 for starting up the motor 51 are outputted from the output circuit 110 during the energization period that has been decided and are applied to the motor 51. Thus, torque in the direction of forward rotation is generated in the motor 51, and the motor 51 can start up utilizing the generated torque (that is, inertial force).

After the motor 51 has started up and arrived at substantially normal rotation by the method described above, the motor drive control device 101 may also perform drive control using the method pertaining to the first embodiment described above.

Further, when all of the Hall ICs 54u to 54w are not abnormal, the motor drive control device 101 generates and outputs to the motor 51 the drive voltages SU2 to SW2 for starting up the motor 51 using all of the position detection signals Hu to Hw in order to start up the motor 51 like normally.

<Receiving Unit>

The receiving unit 105b can, like the receiving unit 5b pertaining to the first embodiment, receive various types of operation instructions from the user that are given via the remote controller. In particular, the receiving unit 105b can receive an instruction to execute the operation of deciding the predetermined position of the rotor resulting from the position deciding unit 112 and the operation of generating the drive voltages SU2 to SW2 resulting from the drive voltage generating unit 107 that have been described above and an instruction to stop these operations.

Consequently, like in the first embodiment, the drive voltage generating unit 107 may perform the operation described above automatically when there is abnormality in the position detection signals Hu to Hw or may perform the operation described above only when the receiving unit 105b has received an execution instruction from the user.

(2) Effects (A)

When it is understood beforehand that the Hall ICs 54u to 54w are faulty before startup of the motor 51, this motor drive control device 101 uses direct-current excitation to move the rotor 53 into and fix the rotor 53 in the predetermined position where torque in the direction of forward rotation is generated and thereafter starts up the motor 51. Thus, immediately after startup of the motor 51, torque in the direction of forward rotation is generated in the motor 51, so the motor 51 can reliably start up.

As described above, in the present embodiment, the motor 51 starts up utilizing so-called inertial force, so the motor drive control device 101 can be used when the load of the motor 51 is relatively large.

(B)

Incidentally, when at least one of the Hall ICs 54u to 54w is abnormal, sometimes the motor 51 after startup is affected by the position detection signal Hu to Hw outputted from the Hall IC 54u to 54w that is abnormal. When this happens, an increase in the currents energizing the motor 51 and also noise and vibration end up arising. However, the motor drive control device 101 outputs the drive voltages SU2 to SW2 for starting up the motor 51 during the energization period it has decided on the basis of the state of normality/abnormality of the position detection signals Hu to Hw and stops this output of the drive voltages SU2 to SW2 outside the energization period. Thus, the motor 51 is not affected by the position detection signal Hu to Hw that is abnormal after startup.

(C)

Further, the energization period is a period where the position detection signals Hu to H2 are normal. Thus, the drive voltages SU2 to SW2 for starting up the motor 51 become outputted to the motor 51 in a period where the position detection signals Hu to Hw are normal.

(D)

Further, according to the motor drive control device 101, the abnormality detecting unit 102 performs abnormality detection of the Hall ICs 54u to 54W before startup of the motor 51, so the motor 51 can rotate without being affected by the position detection signal Hu to Hw that is abnormal from immediately after startup.

(E)

Additionally, like in the first embodiment, when abnormality of the position detection signals Hu to Hw has been detected, an information thereof is displayed on the display unit 105a, so the user can know trouble is arising in the Hall ICs 54u to 54w.

(F)

Further, like in the first embodiment, the motor drive control device 101 can receive via the remote controller an instruction to execute the operation described above resulting from the drive voltage generating unit 107. Consequently, the user can select whether or not to have the drive voltage generating unit 107 perform the operation described above and can issue an instruction to the drive voltage generating unit 107 via the remote controller even when abnormality has arisen in the Hall ICs 54u to 54w and an information that abnormality has been detected is being displayed on the display unit 105a. Additionally, the motor drive control device 101 can drive the brushless DC motor 51 by performing the operation described above on the basis of the instruction from the user even when at least one of the Hall ICs 54u to 54w is abnormal.

In the present embodiment, like in the first embodiment, there has been described a case where the motor drive control device 101 controls the driving of the fan motor 51 to which the propeller fan 61 is connected as a load. In this manner, the effects described above (in particular, effects (A), (B), and (C)) can be achieved even more by using the motor 51 whose inertia is relatively large (that is, the motor 51 to which a relatively large load is connected). For example, as described in effect (A), the motor 51 starts up utilizing so-called inertial force, so the larger the load connected to the motor 51 is, the more the effect of reliably starting up the motor 51 can be achieved. Further, in the description of effects (B) and (C), the motor 51 whose inertia is relatively large like a fan motor rotates utilizing inertia when it has moved from the energization period to the non-energization period where the output of the drive voltages SU2 to SW2 is stopped, so it becomes difficult for the motor 51 to stop.

<Third Embodiment>

Figure 10:
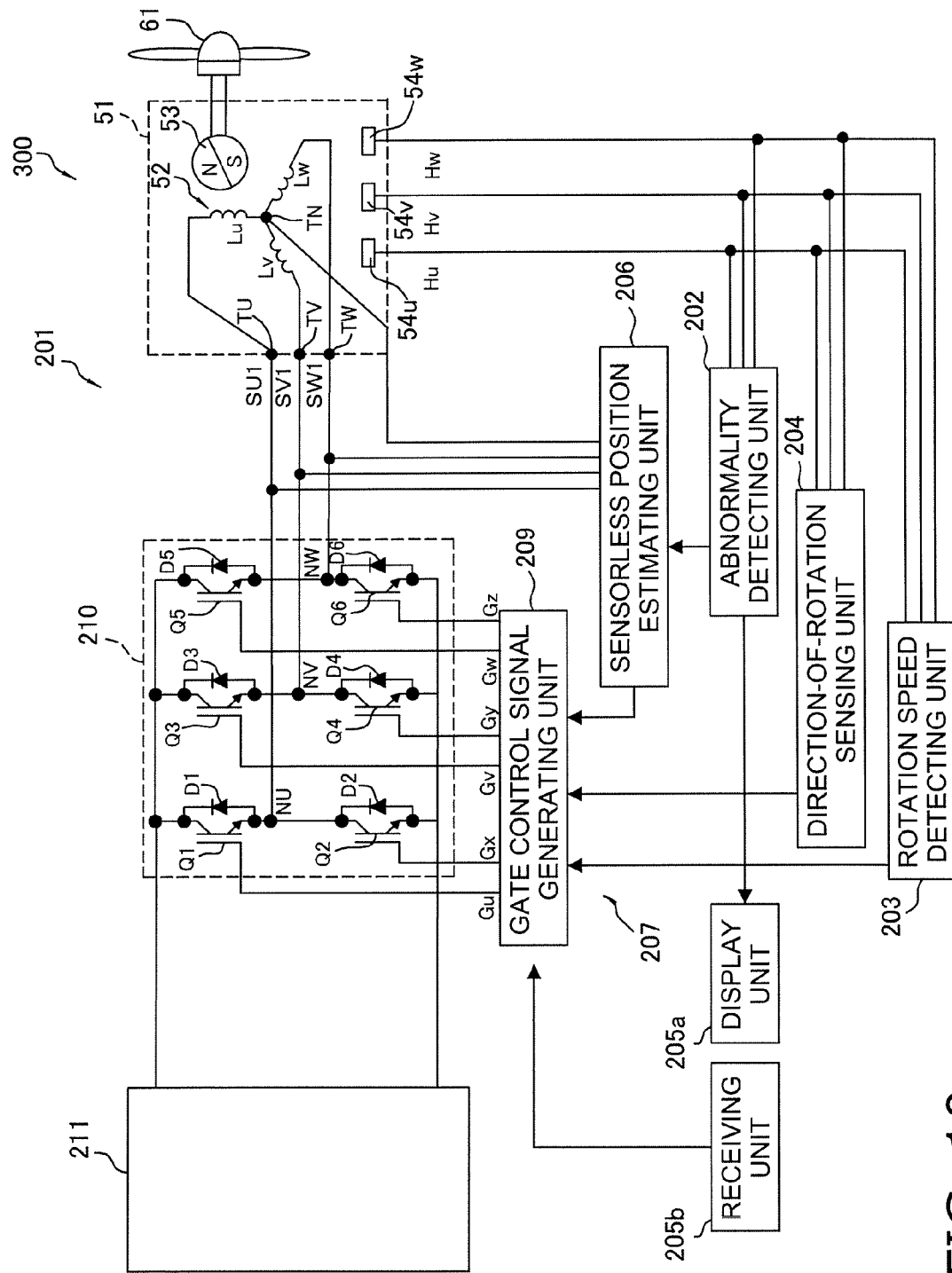
FIG. 10 is a block diagram showing the configuration of the entirety of a system where a motor drive control device pertaining to a third embodiment is employed and the internal configuration of the motor drive control device.

In a third embodiment, there will be described another method that is capable of reliably starting up and driving the motor 51 when there is abnormality in at least one of the Hall ICs 54u to 54w already from before startup of the motor 51 or when at least one of the Hall ICs 54u to 54w has become abnormal at the time of normal rotation of the motor 51. FIG. 10 is a configuration diagram of the entirety of a motor drive control system 300 including a motor drive control device 201 pertaining to the third embodiment and a motor 51 that is driven and controlled by this motor drive control device 201.

Here, the motor 51 pertaining to the present embodiment has the same configuration as that of the motor 51 of the first embodiment, so the same reference numerals as in FIG. 1 will be given thereto. That is, the motor 51 is a fan motor for an outdoor unit and is a 3-phase brushless DC motor equipped with a stator 52 including U-phase, V-phase and W-phase drive coils Lu to Lw, a rotor 53 having plural magnetic poles, and Hall ICs 54u to 54w.

(1) Configuration of Motor Drive Control Device

The motor drive control device 201 starts up the motor 51 by sensorless driving when trouble is arising in at least one of the Hall ICs 54u to 54w from before startup of the motor 51.

This motor drive control device 201 is, as shown in FIG. 10, equipped with an abnormality detecting unit 202, a rotation speed detecting unit 203, a direction-of-rotation sensing unit 204, a display unit 205a, a receiving unit 205b (which corresponds to an instruction receiving unit), a sensorless position estimating unit 206, and a drive voltage generating unit 207. The drive voltage generating unit 207 has a gate control signal generating unit 209 and an output circuit 210. The abnormality detecting unit 202, the rotation speed detecting unit 203, the direction-of-rotation sensing unit 204, the display unit 205a, and the output circuit 210 of the drive voltage generating unit 207 have the same configurations as those of the abnormality detecting unit 2, the rotation speed detecting unit 3, the direction-of-rotation sensing unit 4, the display unit 5a, and the output circuit 10 of the drive voltage generating unit 7 pertaining to FIG. 1 shown with the same names in the first embodiment, so detailed description thereof will be omitted. Hereinafter, the sensorless position estimating unit 206, the gate control signal generating unit 209 and the receiving unit 205b, which are one characteristic of the present embodiment, will be described.

<Sensorless Position Estimating Unit>

The sensorless position estimating unit 206 includes a position detection comparator and the like as in the first embodiment and detects the position of the rotor 53 with respect to the stator 52 on the basis of the induced voltages Vun to Vwn generated in the motor 51 and the neutral voltage of the motor 51 (specifically, the voltage of the terminal TN of the motor 51). That is, the sensorless position estimating unit 206 estimates the position of the rotor 53 without using the position detection signals Hu to Hw. The sensorless position estimating unit 206 may also function all the time regardless of whether or not there is abnormality in at least one of the position detection signals Hu to Hw.

<Gate Control Signal Generating Unit>

The gate control signal generating unit 209 generates the gate control signals Gu to Gz on the basis of the position detection signals Hu to Hw outputted from the Hall ICs 54u to 54w when all of the Hall ICs 54u to 54w are normal. The gate control signal generating unit 209 generates the gate control signals Gu to Gz regardless of the position of the rotor 53 when at least one of the Hall ICs 54u to 54w is abnormal. At this time, drive voltages SU3 to SW3 for starting up the motor 51 regardless of the position of the rotor 53 are outputted from the output circuit 210. Specifically, the gate control signal generating unit 209 performs a so-called synchronized operation where it outputs, as the drive voltages SU3 to SW3, predetermined voltages capable of starting up the motor 51 regardless of the position of the rotor 53 in predetermined frequencies. At this time, the gate control signal generating unit 209 can smoothly accelerate the motor 51 by gradually increasing the predetermined voltages and the predetermined frequencies. Moreover, as described in the second embodiment, by fixing the rotor 53 in the predetermined position before starting up the motor 51, the rotor 53 no longer reversely rotates at the time the synchronized operation starts thereafter, so smoother startup and acceleration become possible. Additionally, the gate control signal generating unit 209 generates the gate control signals Gu to Gz on the basis of the position of the rotor 53 that has been estimated by the sensorless position estimating unit 206 as a result of the induced voltages of the motor 51 being generated after startup of the motor 51. At this time, the drive voltages SU3 to SW3 for normally rotating the motor 51 are outputted from the output circuit 210, and an information that abnormality has been detected is displayed on the display unit 205a.

When it has been detected by the abnormality detecting unit 202 that at least one of the position detection signals Hu to Hw is abnormal while the motor 51 is rotating, the motor drive control device 201 performs the operation described above after temporarily stopping the rotation of the motor 51.

<Receiving Unit>

The receiving unit 205b can, like the receiving units 5b and 105b pertaining to the first and second embodiments, receive various types of operation instructions from the user that are given via the remote controller. In particular, the receiving unit 205b can receive an instruction to execute the operation of generating the drive voltages SU3 to SW3 resulting from the drive voltage generating unit 207 described above (that is, the operation of generating the drive voltages SU3 to SW3 resulting from the gate control signal generating unit 209) and an instruction to stop these operations. More specifically, the receiving unit 205b can receive an instruction to execute the operations where, at the time of startup of the brushless DC motor 51, the drive voltages SU3 to SW3 for starting up the brushless DC motor 51 regardless of the position of the rotor 53 are generated and where, after startup of the brushless DC motor 51, the drive voltages SU3 to SW3 are generated on the basis of the position of the rotor 53 that has been estimated.

Consequently, like in the first and second embodiments, the drive voltage generating unit 207 may perform the operation described above automatically when there is abnormality in the position detection signals Hu to Hw or may perform the operation described above only when the receiving unit 205b has received an execution instruction from the user.

(2) Effects (A)

This motor drive control device 201 performs sensorless driving in regard to the motor 51 when even one of the Hall ICs 54u to 54w is abnormal. Consequently, when there is abnormality in at least one of the Hall ICs 54u to 54w already from before startup of the motor 51, or even when at least one of the Hall ICs 54u to 54w has become abnormal at the time of normal rotation of the motor 51, the motor 51 can be started up and driven without being affected by the Hall IC 54u to 54w that is abnormal.

(B)

Additionally, like in the first and second embodiments, when even one of the Hall ICs 54u to 54w is abnormal, an information thereof is displayed on the display unit 205a, so the user can know trouble is arising in the Hall ICs 54u to 54w.

(C)

Further, like in the first and second embodiments, the motor drive control device 201 can receive, via the remote controller, an instruction to execute the operation described above resulting from the drive voltage generating unit 207. Consequently, the user can select whether or not to have the drive voltage generating unit 207 perform the operation described above and can issue an instruction via the remote controller to the drive voltage generating unit 207 even when abnormality has arisen in the Hall ICs 54u to 54w and an indication that abnormality has been detected is being displayed on the display unit 205a. Additionally, the motor drive control device 201 can start up and drive the brushless DC motor 51 by performing the operation described above on the basis of the instruction from the user even when at least one of the Hall ICs 54u to 54w is abnormal.

<Other Embodiments>

(a)

In the first to third embodiments, there have been described cases where Hall ICs are used as the position detecting units, but the position detecting units may also be position detecting units other than Hall ICs. Examples of the position detecting units pertaining to the present invention may include the following:

(I) position detecting units that directly detect the position of the rotor 53 with magnetic detection sensors like Hall elements or Hall ICs; and (II) position detecting units that indirectly detect the position of the rotor 53 using the induced voltages Vun, Vvn and Vwn generated in the drive coils Lu, Lv and Lw.

(b)

In the first embodiment described above, there has been described a case where, as shown in FIG. 5, the drive voltages SU1 to SW1 are generated using the maximum number of the position detection signals Hu to Hw that are normal (that is, using two of the position detection signals Hu to Hw when there are two of the position detection signals Hu to Hw that are abnormal), but the invention is not limited to this. For example, the drive voltages SU1 to SW1 may also be generated using one of the position detection signals Hu to Hw when there are two of the position detection signals Hu to Hw that are normal. However, it becomes possible to more reliably rotate the motor 51 by generating the drive voltages SU1 to SW1 using more of the position detection signals Hu to Hw that are normal.

(c)

In the first and second embodiments described above, there have been described cases where, when the position detection signals Hu to Hw are abnormal, the position-at-time-of-abnormality estimating units 8 and 108 perform position estimation and the results thereof are used to generate the drive voltages. However, when the position detection signals Hu to Hw are abnormal, the drive voltages may also be generated using only the position detection signals Hu to Hw that are normal, and without position estimation by the position-at-time-of-abnormality estimating units 8 and 108 being performed.

Examples of methods by which the drive voltages are generated using only the position detection signals Hu to Hw that are normal include a method of presetting patterns of the drive voltages that should be generated when one of the position detection signals Hu to Hw is normal and when two of the position detection signals Hu to Hw are normal. In this method, when abnormality has arisen in at least one of the position detection signals Hu to Hw, a pattern of the drive voltages that should be outputted to the brushless DC motor 51 is selected from among the preset patterns of the drive voltages on the basis of the remaining position detection signals Hu to Hw that are normal, and the pattern of the drive voltages that has been selected is generated and outputted to the brushless DC motor 51.

Specifically, for example, when the position detection signal Hu is abnormal, the drive voltage generating unit 7 selects a pattern of the drive voltages SU1 to SW1 on the basis of the position detection signals Hv and Hw that are not abnormal. To describe an embodiment of this case using FIG. 6, there are four combinations of the position detection signals when there are only the position detection signals "Hv" and "Hw"—a case where these signals are both "0", cases where either one is "1", and a case where the signals are "1"—so the drive voltage generating unit 7 selects patterns (which correspond to energization patterns pertaining to FIG. 6) of the drive voltages SU1 to SW1 corresponding respectively to these four cases. The drive voltage generating unit 7 selects energization pattern "1" when, for example, the position detection signals Hv and Hw are both "1" and selects energization pattern "2" when the position detection signal Hv is "0" and the position detection signal Hw is "1".

In this manner, when one of the three position detection signals Hu, Hv and Hw is abnormal and cannot be used (in the specific example described above, the position detection signal Hu is abnormal), there become four energization patterns that are patterns of the drive voltages SU1 to SW1. That is, when all of the three position detection signals Hu, By and Hw are normal, there are six energization patterns, but when one of the position detection signals becomes abnormal, there become four energization patterns, or two fewer than the normal six. For that reason, the energization widths of the drive voltages SU1 to SW1 are not 120 degrees and even but become 60 degrees, 120 degrees and 180 degrees because of the phases, and the values of the drive voltages SU1 to SW1 also become different values because of the phases, but when focused on per each phase, the drive voltages SU1 to SW1 are positive and negative balanced, so stable operation of the brushless DC motor 51 becomes possible.

(d)

In the first to third embodiments described above, there have been taken as examples and described cases where the motor drive control devices 1, 101 and 201 respectively drive the fan motor 51 in the outdoor unit of the air conditioner, but the invention is not limited thereto. The motor drive control devices 1, 101 and 201 pertaining to the present invention can also be applied to cases where they drive a motor for a ventilation fan, for example.

(e)

In the first to third embodiments described above, there have been described cases where insulated gate bipolar transistors are used as the output circuits 10, 110 and 210, but the invention is not limited thereto. The output circuit may also have a configuration using MOS transistors, for example, instead of insulated gate bipolar transistors.

(f)

In the first to third embodiments described above, there have been described cases where the motor drive control devices 1, 101 and 201 are respectively equipped with the direction-of-rotation sensing units 4, 104 and 204 for sensing the direction of rotation of the rotor 53, but the invention is not limited thereto. When the motor drive control device is used for driving a motor that does not reversely rotate, for example, the direction-of-rotation sensing unit does not have to be disposed.

(g)

In the first and second embodiments described above, as shown in FIG. 1 and FIG. 8, the functional unit (specifically, the position-at-time-of-abnormality estimating unit) that estimates the position of the rotor 53 when one or two of the Hall ICs 54u to 54w is abnormal and the functional unit (specifically, the sensorless position estimating unit) that estimates the position of the rotor 53 at the time of sensorless driving are divided. However, position estimation of the rotor 53 when one or two of the Hall ICs 54u to 54w is abnormal and position estimation of the rotor 53 at the time of sensorless driving may also be performed by one functional unit. Thus, the motor drive control device itself can be made relatively small because it suffices to dispose one functional unit that estimates the position of the rotor 53 without dividing the functional unit into being for the time of sensorless driving and being for outside the time of sensorless driving.

(h)

In the second embodiment described above, there has been described a case where the drive voltage generating unit 107 generates the drive voltages (that is, fixed voltages) for fixing the rotor 53 in the predetermined position and generates the drive voltages for starting up the motor 51. However, the functional unit that generates each of these various types of drive voltages may also be dividedly configured. That is, a fixed voltage generating unit that generates the drive voltages (that is, fixed voltages) for fixing the rotor 53 in the predetermined position and a drive voltage generating unit that generates the drive voltages for starting up the motor 51 may also be separately disposed.

(i)

In the second embodiment described above, there has been described a case where the energization period of the drive voltages SU2 to SW2 is determined on the basis of the state of normality/abnormality of the position detection signals Hu to Hw. However, with this method, there is the fear that the energization period will end up decreasing in comparison to the normal time. In order to improve this and make the energization period into a 360-degree period that corresponds to the normal time, the drive voltage generating unit 107 may also perform a so-called synchronized operation to output, in predetermined frequencies, predetermined voltages capable of starting up the motor 51. At this time, it becomes possible for the drive voltage generating unit 107 to smoothly accelerate the motor 51 by gradually increasing the predetermined voltages and the predetermined frequencies.

(j)

In the third embodiment described above, there has been described a case where the sensorless position estimating unit 206 estimates the position of the rotor 53 on the basis of the induced voltages of the motor 51. However, the method by which the sensorless position estimating unit 206 estimates the position of the rotor 53 is not limited to this method. Examples of other methods of estimating the position of the rotor 53 include a method of estimating the position of the rotor 53 by superimposing high-frequency signals on the drive voltages SU3 to SW3 and outputting these to the motor 51 and a method of estimating the position of the rotor 53 on the basis of an electric model of the motor 51 and also the voltages applied to the motor 51 and the currents flowing in the motor 51.

INDUSTRIAL APPLICABILITY

The motor drive control device pertaining to the present invention can be applied as a device for controlling the driving of a brushless motor used as a rotation drive source of a compressor and a fan in an air conditioner or a motor for a ventilation fan, for example.

EXPLANATION OF THE REFERENCE SIGNS 1, 101, 201 Motor Drive Control Device
2, 102, 202 Abnormality Detecting Unit
3, 103, 203 Rotation Speed Detecting Unit
4, 104, 204 Direction-of-Rotation Sensing Unit
5a, 105a, 205a Display Unit
5b, 105b, 205b Receiving Unit
6, 106 206 Sensorless Position Estimating Unit
7, 107, 207 Drive Voltage Generating Unit
8, 108 Position-at-Time-of-Abnormality Estimating Unit
9, 109, 209 Gate Control Signal Generating Unit
10, 110, 210 Output Circuit
12 Phase Difference Detecting Unit
51 Brushless DC Motor
52 Stator
53 Rotor
54 Hall ICs
61 Fan
112 Position Deciding Unit
Lu, Lv, Lw Drive Coil
SU1 to SW1, SU2 to SW2, SU3 to SW3 Drive Voltage
Gu to Gz Gate Control Signal
Hu to Hw Position Detection Signal
Hu1' to Hw1' Sensorless Position Estimation Signal
Hu2' to Hw2' Position-at-Time-of-Abnormality Estimation Signal
<Patent Document 1> JP-A No. 8-331886
<Patent Document 2> JP-A No. 2000-184774

What is claimed is:

1. A motor drive control device configured to control driving of a brushless DC motor including a stator having drive coils, a rotor having plural magnetic poles, and plural position detecting units that output position detection signals representing position of the rotor with respect to the stator, the motor drive control device comprising:
an abnormality detecting unit configured to detect abnormality of each of the position detection signals;
a drive voltage generating unit configured to generate and output, when abnormality of at least one of the position detection signals has been detected by the abnormality detecting unit, drive voltages to the brushless DC motor to drive the brushless DC motor based on at least one of the remaining position detection signals excluding the position detection signal that has been detected as abnormal; and
a phase difference detecting unit configured to detect phase differences between
the remaining position detection signals excluding the position detection signal that has been detected as abnormal and
induced voltages generated in each of the drive coils corresponding to the remaining position detection signals, wherein
the drive voltage generating unit is further configured to generate the drive voltages based on the phase differences and polarities of the remaining position detection signals.

2. The motor drive control device according to claim 1, wherein
the drive voltage generating unit is further configured to estimate the position of the rotor using at least one of the remaining position detection signals excluding the position detection signal that has been detected as abnormal and to generate the drive voltages based on the position of the rotor estimated.

3. The motor drive control device according to claim 1, further comprising
a rotation speed detecting unit configured to detect a rotation speed of the rotor using at least one of the remaining position detection signals excluding the position detection signal that has been detected as abnormal, wherein
the drive voltage generating unit is further configured to generate the drive voltages based on the rotation speed of the rotor detected by the rotation speed detecting unit.

4. The motor drive control device according to claim 1, wherein
the drive voltage generating unit is further configured to select and output the drive voltages to the brushless DC motor in a pattern from among preset patterns of the drive voltages based on at least one of the remaining position detection signals excluding the position detection signal that has been detected as abnormal.

5. The motor drive control device according to claim. 1, wherein
the drive voltage generating unit is further configured to decide an energization period of the drive voltages based on a state of normality/abnormality of the position detection signals and to output the drive voltages during the energization period, and the energization period is a period where the position detection signals are normal.

6. The motor drive control device according to claim 1, further comprising
a position deciding unit configured to decide a predetermined position of the rotor such that torque in a direction of forward rotation is generated at a time when the drive voltages have been applied at a time of startup of the brushless DC motor, wherein
the drive voltage generating unit is further configured to generate the drive voltages such that the rotor moves into the predetermined position, and to generate the drive voltages to start up the brushless DC motor after the rotor has moved into the predetermined position.

7. The motor drive control device according to claim 1, further comprising
a display unit configured to display that the abnormality detecting unit has detected abnormality of the position detection signals when abnormality of at least one of the position detection signals is detected.

8. The motor drive control device according to claim 1, further comprising
an instruction receiving unit configured to receive an instruction to execute an operation whereby the drive voltages are generated based on at least one of the remaining position detection signals excluding the position detection signal that has been detected as abnormal.

9. A motor drive control device configured to control driving of a brushless DC motor including a stator having drive coils, a rotor having plural magnetic poles, and plural position detecting units that output position detection signals representing position of the rotor with respect to the stator, the motor drive control device comprising:
a position deciding unit configured to decide a predetermined position of the rotor, the predetermined position being a position at which torque in a direction of forward rotation is generated at a time of application of drive voltages to start up the brushless DC motor when at least one of the position detecting units outputs an abnormal position detection signal;
a fixed voltage generating unit configured to generate and output fixed voltages to the brushless DC motor before start up of the brushless DC motor such that the rotor is moved into and fixed in the predetermined position before start up of the brushless DC motor; and
a drive voltage generating unit configured to generate and output the drive voltages to the brushless DC motor after the rotor has been fixed in the predetermined position, the drive voltages being different than the fixed voltages, the predetermined position being a position where the drive voltages applied to each phase become stable.

10. The motor drive control device according to claim 9, wherein
the drive voltage generating unit is further configured to decide an energization period of the drive voltages based on a state of normality/abnormality of the position detection. signals and to output the drive voltages during the energization period.

11. The motor drive control device according to claim 10, wherein
the energization period is a period where the position detection signals are normal.

12. The motor drive control device according to claim 9, further comprising
an abnormality detecting unit configured to perform abnormality detection of the position detection signals output from position detecting units before startup of the brushless DC motor.

13. The motor drive control device according to claim 12, further comprising
a display unit configured to display that the abnormality detecting unit has detected abnormality of the position detecting units when abnormality of at least one of the position detection signals is detected.

14. The motor drive control device according to claim 9, further comprising
an instruction receiving unit configured to receive an instruction to execute
an operation of deciding the predetermined position of the rotor by the position deciding unit,
an operation of generating the fixed voltages by the fixed voltage generating unit, and
an operation of generating the drive voltages by the drive voltage generating unit.

15. A motor drive control device configured to control driving of a brushless DC motor including a stator having drive coils, a rotor having plural magnetic poles, and plural position detecting units that output position detection signals—representing position of the rotor with respect to the stator the motor drive control device comprising:
an abnormality detecting unit configured to detect abnormality of each of the position detection signals;
a drive voltage generating unit configured to generate and output, when abnormality of at least one of the position detection signals has been detected by the abnormality detecting unit, drive voltages to the brushless DC motor to drive the brushless DC motor based on at least one of the remaining position detection signals excluding the position detection signal that has been detected as abnormal; and
a position deciding unit configured to decide a predetermined position of the rotor such that torque in a direction of forward rotation is generated at a time when the drive voltages have been applied at a time of startup of the brushless DC motor, wherein
the drive voltage generating unit being further configured to select and output the drive voltages to the brushless DC motor in a pattern from among preset patterns of the drive voltages based on at least one of the remaining position detection signals excluding the position detection signal that has been detected as abnormal, and
the drive voltage generating unit being further configured to generate the drive voltages such that the rotor moves into the predetermined position, and
to generate the drive voltages to start up the brushless DC motor after the rotor has moved into the predetermined position.

16. The motor drive control device according to claim 15, further comprising
a rotation speed detecting unit configured to detect a rotation speed of the rotor using at least one of the remaining position detection signals excluding the position detection signal that has been detected as abnormal, wherein
the drive voltage generating unit is further configured to generate the drive voltages based on the rotation speed of the rotor detected by the rotation speed detecting unit.

17. The motor drive control device according to claim 15, wherein
the drive voltage generating unit is further configured to decide an energization period of the drive voltages based on a state of normality/abnormality of the position detection signals and to output the drive voltages during the energization period, and the energization period is a period where the position detection signals are normal.

18. The motor drive control device according to claim 15, further comprising
a display unit configured to display that the abnormality detecting unit has detected abnormality of the position detection signals when abnormality of at least one of the position detection signals is detected.

19. The motor drive control device according to claim 15, further comprising
an instruction receiving unit configured to receive an instruction to execute an operation whereby the drive voltages are generated based on at least one of the remaining position detection signals excluding the position detection signal that has been detected as abnormal.

* * * * *

UNITED STATES PATENT AND TRADEMARK OFFICE
CERTIFICATE OF CORRECTION

| | |
|---|---|
| PATENT NO. | : 8,564,232 B2 |
| APPLICATION NO. | : 12/812764 |
| DATED | : October 22, 2013 |
| INVENTOR(S) | : Toshiaki Sato et al. |

Page 1 of 1

It is certified that error appears in the above-identified patent and that said Letters Patent is hereby corrected as shown below:

In the Claims

Column 29,
Line 37, "detection, signals and to output the drive voltages during" should read -- detection signals and to output the drive voltages during --

Column 30,
Line 5, "nals–representing position of the rotor with respect to the" should read -- nals-representing position of the rotor with respect to the --

Column 30,
Line 6, "stator the motor drive control device comprising:" should read -- stator, the motor drive control device comprising: --

Signed and Sealed this
Eleventh Day of February, 2014

Michelle K. Lee
*Deputy Director of the United States Patent and Trademark Office*